US008981896B2

(12) United States Patent
Smith

(10) Patent No.: US 8,981,896 B2
(45) Date of Patent: Mar. 17, 2015

(54) ON-VEHICLE TICKETING AND VALIDATION

(71) Applicant: CUBIC CORPORATION, San Diego, CA (US)

(72) Inventor: Gavin Ritchie Smith, Crawley (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/337,792

(22) Filed: Jul. 22, 2014

(65) Prior Publication Data

US 2015/0025921 A1 Jan. 22, 2015

Related U.S. Application Data

(60) Provisional application No. 61/857,101, filed on Jul. 22, 2013.

(51) Int. Cl.
*G05B 19/00* (2006.01)
*G06Q 10/02* (2012.01)
*G06Q 20/32* (2012.01)

(52) U.S. Cl.
CPC .............. *G06Q 10/02* (2013.01); *G06Q 20/322* (2013.01)
USPC ............ 340/5.42; 340/8.1; 705/27.1; 705/44; 348/158

(58) Field of Classification Search
CPC .......... G08B 13/19621; G08B 25/016; G08B 3/1083; G08B 13/2462; H04N 7/185; F41G 3/165; G06F 1/1686; G06Q 40/00; G06Q 40/06; G06Q 40/04; G06Q 40/02; G06Q 20/10; G06Q 20/4037; G06Q 20/3415; G07F 7/08; G07F 7/1008; G07C 9/00039; G07C 9/00111; G06K 2017/0045; G01S 13/878

USPC .......... 340/5.42, 8.1; 705/44, 35, 14.49, 26.3, 705/27.1; 348/158
See application file for complete search history.

(56) References Cited

U.S. PATENT DOCUMENTS

| 7,012,547 | B2 | 3/2006 | Hassett |
| 7,200,382 | B2 | 4/2007 | Arai |
| 7,990,286 | B2 | 8/2011 | Shankwitz et al. |
| 8,018,330 | B2 | 9/2011 | Stoffelsma et al. |
| 2004/0119609 | A1 | 6/2004 | Solomon |
| 2009/0050686 | A1 | 2/2009 | Kon et al. |
| 2009/0125429 | A1* | 5/2009 | Takayama ........................ 705/35 |
| 2010/0017275 | A1 | 1/2010 | Carlson et al. |
| 2010/0076878 | A1 | 3/2010 | Burr et al. |
| 2011/0137773 | A1 | 6/2011 | Davis et al. |
| 2011/0153495 | A1 | 6/2011 | Dixon et al. |

(Continued)

FOREIGN PATENT DOCUMENTS

| EP | 1667075 A1 | 6/2006 |
| WO | 00/31691 | 6/2000 |

(Continued)

OTHER PUBLICATIONS

GWT-TUD GmbH Department for Transport, "Be-in-Be-Out Payment Systems for Public Transport," Final Report, Jul. 2009, 160 pages.

(Continued)

*Primary Examiner* — Omer S Khan
(74) *Attorney, Agent, or Firm* — Kilpatrick Townsend & Stockton LLP

(57) ABSTRACT

Enabling a passenger of a vehicle to enter or board the vehicle without necessarily having previously purchased a ticket or fare, and then to perfect a ticket purchase using their handheld device while on-board the vehicle.

15 Claims, 13 Drawing Sheets

(56) References Cited

U.S. PATENT DOCUMENTS

| | | | |
|---|---|---|---|
| 2012/0162436 A1* | 6/2012 | Cordell et al. | 348/158 |
| 2012/0203630 A1* | 8/2012 | Goel | 705/14.49 |
| 2012/0254040 A1* | 10/2012 | Dixon et al. | 705/44 |

FOREIGN PATENT DOCUMENTS

| | | |
|---|---|---|
| WO | 01/69540 | 9/2001 |
| WO | 2005/031656 | 4/2005 |

OTHER PUBLICATIONS

International Search Report and Written Opinion of PCT/US2010/057899, mailed Feb. 22, 2011. 10 pages.

Md. Foisal Mahedi Hasan et al. "RFID_based Ticketing for Public Transport System: Perspective Megacity Dhaka" Jul. 9-11, 2010, 5 pages.

Scourias, John, "Overview of the Global System for Mobile Communications," last modified Mar. 27, 1996. 16 pages.

\* cited by examiner

ON-VEHICLE TICKETING AND VALIDATION

CROSS-REFERENCE TO RELATED APPLICATION

This application claims the benefit of U.S. provisional patent application Ser. No. 61/857,101, filed 22 Jul. 2013, entitled "ON TRAIN NFC TICKETING," the entirety of which is hereby incorporated by reference for all intents and purposes.

SUMMARY

In an aspect a computer-implemented method includes or comprises receiving, by a computing system from a mobile device, data that at least specifies a particular seat within a transit vehicle based upon a scan of a tag associated with the particular seat by the mobile device, when the mobile device is located within the transit vehicle. In some examples, the method further includes or comprises sending, by the computing system to the mobile device, data that at least specifies terms that when accepted permits an individual associated with the mobile device to travel on the transit vehicle within the particular seat. In some examples, the method further includes or comprises receiving, by the computing system from the mobile device, data that at least specifies acceptance to the terms to permit the individual associated with the mobile device to travel on the transit vehicle within the particular seat.

In an aspect, a computer-implemented method includes or comprises receiving, by a mobile device based upon a scan of a tag associated with a particular seat within a transit vehicle, and when the mobile device is located within the transit vehicle, particular data that at least identifies the particular seat. In some examples, the method further includes or comprises sending, by the mobile device to a computing system different than the mobile device, at least the particular data that at least identifies the particular seat. In some examples, the method further includes or comprises receiving, by the mobile device from the computing system, data that at least specifies terms that when accepted authorizes an individual associated with the mobile device to travel on the transit vehicle within the particular seat.

In an aspect, a computer-implemented method include or comprises receiving, by a computing system from a mobile device, data that at least specifies a particular seat within a transit vehicle based upon a scan of a tag associated with the particular seat by the mobile device and selected from a near-field communication tag and a two-dimensional barcode, when the mobile device is located within the transit vehicle. In some examples, the method further includes or comprises sending, by the computing system to the mobile device, data that at least specifies terms that when accepted permits an individual to travel on the transit vehicle within the particular seat. In some examples, the method further includes or comprises receiving, by the computing system from the mobile device, data that at least specifies acceptance to the terms to permit the individual associated with the mobile device to travel on the transit vehicle within the particular seat. In some examples, the method further includes or comprises updating by the computing system a status associated with the particular seat to reflect acceptance to the terms to permit the individual to travel on the transit vehicle within the particular seat.

Although not so limited, an appreciation of the various aspects of the present disclosure may be gained from the following discussion in connection with the drawings. A brief description of which is hereby provided.

DETAILED DESCRIPTION

The present disclosure is directed to or towards a system and method to enable a passenger of a vehicle to enter or board the vehicle without necessarily having previously purchased, or pre-purchased, a ticket or fare, and then to "swipe" or "touch" their handheld device to or against a passive tag or other machine-readable element positioned within the vehicle, the same being encoded with information that identifies at least a seat number of the vehicle, and then in light of said encoded information perfect a ticket purchasing process using the handheld in substantially real-time. Other aspects of the present disclosure are related to steps or actions taken by a revenue inspector to validate and/or sell tickets to particular vehicle passengers. Still other aspects of the present disclosure are related to steps or actions taken by an installation engineer to activate and install various passive tags or machine-readable elements at particular locations within the vehicle.

Figure 1:
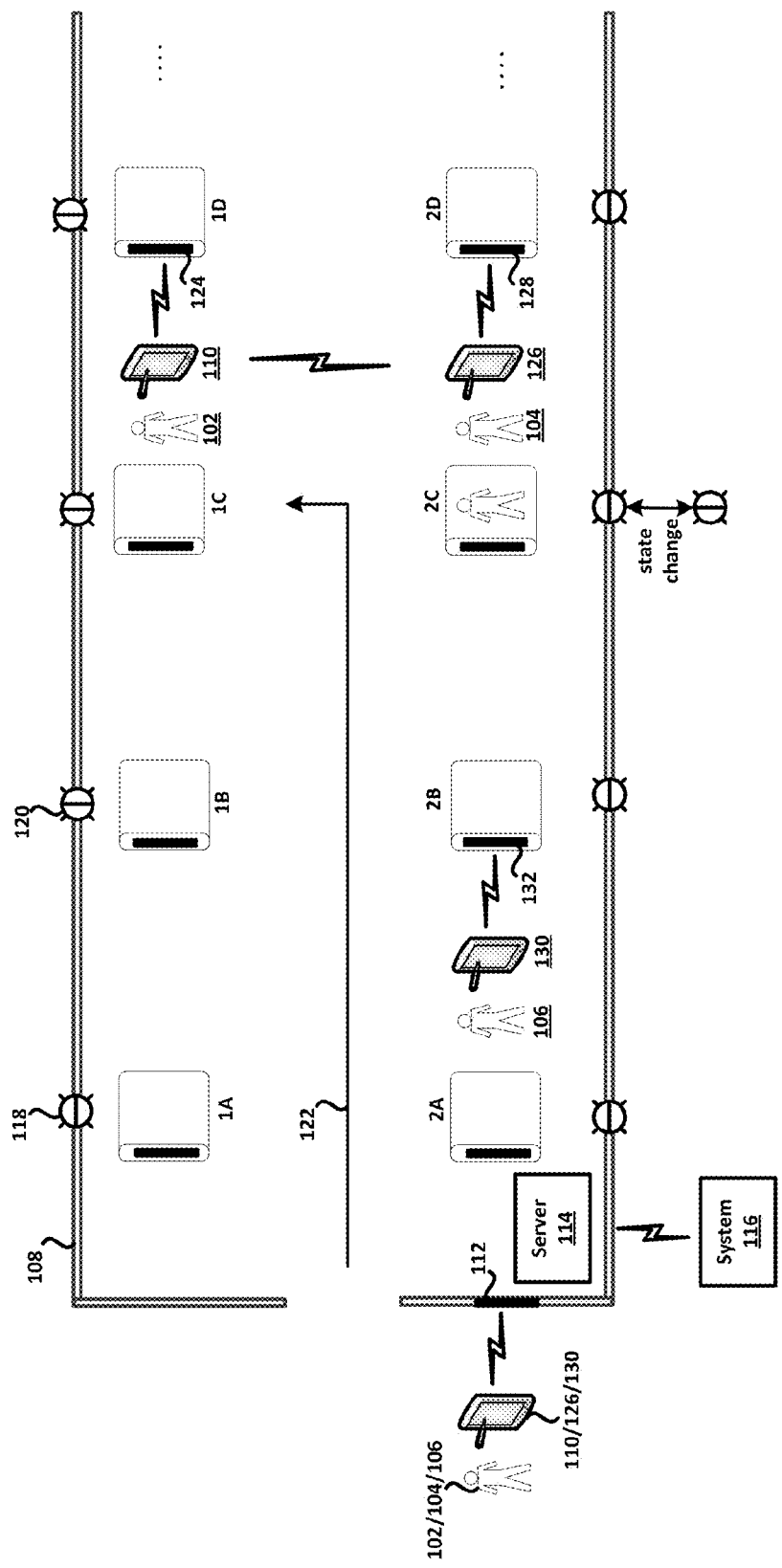
FIG. 1 shows a vehicle plan view in accordance with the disclosure.

For instance, referring now to FIG. 1, an example vehicle plan view 100 is shown. More specifically, vehicle plan view 100 may be used to illustrate (1) various steps or actions taken by particular vehicle passenger 102 to perfect a ticket purchasing process in substantially real-time, (2) various steps or actions taken by particular revenue inspector 104 to validate tickets and/or or sell tickets to passengers, (3) various steps or actions taken by particular installation engineer 106 to activate and install passive machine-readable elements at particular locations within the vehicle, the same enabling at least in part the on-vehicle ticketing and validation aspects of the present disclosure.

For example, vehicle plan view 100 may be used to illustrate various steps or actions taken by vehicle passenger 102 to perfect a ticket purchasing process, in substantially real-time. Advantageously, this may at least provide vehicle passenger 102 the flexibility to forego any planning and/or intermediate steps associated with ticket booking or purchasing. For example, immediately prior to boarding to vehicle 108, vehicle passenger 102 may initially use smartphone 110 to scan tag 112, as shown in bottom left corner of vehicle plan view 100. It is contemplated that tag 112 may be encoded with various information such as, in the context of a train or rail car implementation for example, train ID/carriage ID (e.g., Train A/Car A), and a uniform resource locator or URL (e.g., www.trainticket.com) associated with a particular ticketing and validation website. In response to the scan or possibly in response to a manual command (e.g., "Enter" or "Select"), smartphone 110 may at least establish a communication link (e.g., via WiFi or Bluetooth®) with on-vehicle server 114 that in turn is network-connected to off-vehicle ticketing and validation system 116. In some examples, functionality associated with off-vehicle system 116 may be performed wholly or at least partially by on-vehicle server 114.

In the present example though, on-vehicle server 114 may operate or function as a gateway between smartphone 110 and off-vehicle system 116. For example, at least information encoded to tag 112 may initially be transferred to on-vehicle server 114 from smartphone 110, and then to off-vehicle system 116 from on-vehicle server 114. In response, off-vehicle system 116 may retrieve up-to-date ticketing information and return the same to smartphone 110 via on-vehicle server 114. It is contemplated that the ticketing information may enable vehicle passenger 102 to efficiently or swiftly choose a particular seat within vehicle 108, as desired. For example, the ticketing information may enable a mobile application and/or browser installed to smartphone 110 to display a map, similar to vehicle plan view 100, in which each "available" seat within vehicle 108 may be identified by particular icon 118, and each "unavailable" seat within vehicle 108 may be identified by particular icon 120. It is contemplated that icon 118 and icon 120 may exhibit any particular trait, provided that the same are distinguishable from one another. Examples traits include colors (e.g., green/red), shapes (e.g., circle/square), and even combinations thereof.

In some examples, each available seat within vehicle 108 may further be identified by a seat number (e.g., "Seat 1C" or "Seat 2C") within the browser to enable vehicle passenger 102 to swiftly traverse vehicle 108 to reach a particular seat, and then begin the ticketing process. In some examples, vehicle passenger 102 may utilize the mobile application installed to smartphone 110 to "tap" a particular available seat, and then guide 122 may be displayed to assist vehicle passenger 102 to swiftly traverse vehicle 108, and then begin the ticketing process. It is contemplated that vehicle passenger 102 may in either of these scenarios "tap" a particular available seat, and this action may reserve that particular seat for vehicle passenger 102. For example, smartphone 110 may connect to on-vehicle server 114 in response to a "tap" of Seat 1C within the browser installed to smartphone 110, and then on-vehicle server 114 may connect to off-vehicle system 116 to update and cause change of the icon associated with Seat 1C to particular icon 120. In this manner, a different vehicle passenger engaged in a similar ticketing process may in substantially real-time be informed of status of Seat 1C, provided they have a handheld device communicatively connected to one or both of on-vehicle server 114 and off-vehicle system 116. Further, the "tap" may hold or reserve Seat 1C for vehicle passenger 102 for a predetermined and configurable time period (e.g., 5 minutes) and, upon expiration thereof without confirmation of ticket purchase, off-vehicle system 116 may update and cause change of icon associated with Seat 1C back to particular icon 118.

Continuing with the present example, vehicle passenger 102 may traverse vehicle 108 to reach Seat 1C, and then begin the ticket purchasing process. In particular, vehicle passenger 102 may use their smartphone 110 to scan tag 124, as shown in upper right corner of vehicle plan view 100. It is contemplated that tag 112 may be encoded with various information such as, for example, train ID/carriage ID/seat ID (e.g., Train A/Car A/Seat 1C), and a URL (e.g., www.trainticket/purchase.com) associated with a particular ticketing and validation website. In response to the scan, smartphone 110 may establish a communication link with on-vehicle server 114 and in turn to or with off-vehicle system 116. This step of establishing a communication link might be omitted in event vehicle passenger 102 elects to initially scan tag 112 as discussed above. In other words, it is contemplated that the features or aspects of the present disclosure may not necessarily require an initial scan of tag 112. It is further contemplated that, following scan of tag 124, vehicle passenger 102 may navigate the particular website using smartphone 110 to select or otherwise agree to particular commute fare terms (e.g., Heathrow to Piccadilly Circus, £ 25 round-trip), select or otherwise enter payment information (e.g., credit card number), and etc.

Following confirmation of ticket purchase, on-vehicle server 114 and/or off-vehicle system 116 may update one or more records and also cause icon associated with Seat 1C to maintain particular icon 120 for a duration of the ticketed or purchased commute. Further, proof of ticket purchase (e.g., electronic receipt) may be pushed to smartphone 110 so that revenue inspector 104 may swiftly verify or validate that vehicle passenger 102 is properly ticketed for the commute, as discussed further below. Additional, or alternative, steps or actions may be taken by vehicle passenger 102 to perfect a check-in and/or ticket purchasing process in substantially real-time, as discussed in further detail below at least in connection with FIG. 2.

Vehicle plan view 100 may further be used to illustrate various steps or actions taken by revenue inspector 104 to validate and/or or sell tickets to passengers. Advantageously, this may at least reduce or otherwise minimize the need for relatively expensive on-station retail devices or on-train sales staff, and also allows on-train revenue inspectors to direct their activity or attention to unpaid seats. For example, immediately prior to boarding to vehicle 108, revenue inspector 104 may initially use tablet 126 to scan tag 112. As mentioned above, tag 112 may be encoded with various information such as, in the context of a train or rail car implementation for example, train ID/carriage ID (e.g., Train A/Car A), and a URL (e.g., www.trainticket.com) associated with a particular ticketing and validation website. Tag 112 though may further include encoded information readable only by certain authorized devices, i.e., tablet 126. In this manner, revenue inspector 104 may ultimately be able to access information not available to vehicle passenger 102. In response to the scan, tablet 126 may at least establish a communication link with on-vehicle server 114 that in turn is network-connected to off-vehicle system 116.

On-vehicle server 114 may operate or function as a gateway between tablet 126 and off-vehicle system 116. For example, at least information encoded to tag 112 may initially be transferred to on-vehicle server 114 from tablet 126, and then to off-vehicle system 116 from on-vehicle server 114. In response, off-vehicle system 116 may retrieve up-to-date ticketing information and return the same to tablet 126 via on-vehicle server 114. It is contemplated that the ticketing information may enable revenue inspector 104 to swiftly navigate vehicle 108 for the purpose of validating and/or selling tickets to passengers. For example, the ticketing information may enable a mobile application or browser installed to tablet 126 to display a map, similar to vehicle plan view 100, in which each seat within vehicle 108 not having a purchased ticket associated therewith may be identified by particular icon 118, and each seat within vehicle 108 having a purchased ticket associated therewith may be identified by particular icon 120. It will be appreciated that such information may enable revenue inspector 104 to quickly or swiftly prioritize inspection tasks associated with validating and/or selling tickets to passengers.

For example, in some examples, revenue inspector 104 may choose to initially identify potential non-ticketed passengers and then investigate accordingly, so as to prevent fraud and/or possible fare evasion, intended or otherwise. For example, revenue inspector 104 may interact with tablet 126 to firstly identify each seat within vehicle 108 not having a purchased ticket (via identification of particular icon 118) associated therewith and that also has a particular individual sitting for example in a particular seat. For example, revenue inspector 104 may determine from the mobile application on tablet 126 that Seat 2C as shown in FIG. 1 has particular icon 118 associated therewith, yet has a passenger occupying that seat. Revenue inspector 104 may then engage with that passenger to investigate. It may be that the passenger does not have a smartphone or other WiFi-enabled device, has intentionally occupied Seat 2C without purchasing a ticket, and etc.

In the present example, revenue inspector 104 may take measures to remove the passenger occupying seat 2C from vehicle 108 if it is found fraud and/or fare evasion is the intention. Assuming this is not the case, revenue inspector 104 may take measures to assist that passenger to purchase a ticket for their commute. For example, as shown in FIG. 1, revenue inspector 104 may use tablet 126 to scan tag 128. Tag 128 may be encoded with various information such as, for example, train ID/carriage ID/seat ID (e.g., Train A/Car A/Seat 2C), and a URL associated with a particular ticketing and validation website. In response to the scan, tablet 126 may establish or otherwise reestablish a communication link with on-vehicle server 114 and in turn to off-vehicle system 116. It is contemplated that, following scan of tag 128, revenue inspector 104 may permit the passenger to navigate the particular website to select or otherwise agree to particular commute fare terms, select or otherwise enter payment information, and etc. In other examples, revenue inspector 104 may perform this task on behalf of the passenger. Following confirmation of ticket purchase, off-vehicle system 116 may update and cause icon associated with Seat 2C to switch to particular icon 120 for a duration of the ticketed or purchased commute. Further, proof of ticket purchase may be pushed to tablet 126 and, for example, printed to paper so that the passenger has tangible evidence that may be used to provide proof of ticket purchase.

In addition to selling tickets to passengers, revenue inspector 104 may utilize tablet 126 to validate passenger tickets. For example, revenue inspector 104 may choose to secondly (or firstly, if desired) identify potential ticketed passengers and then investigate accordingly, so as to prevent fraud and/or possible fare evasion, intended or otherwise. For example, revenue inspector 104 may interact with tablet 126 to identify each seat within vehicle 108 having a purchased ticket (e.g., via identification of particular icon 120) associated therewith and that also has a particular individual sitting for example in a particular seat (not explicitly shown in FIG. 1). For example, revenue inspector 104 may determine from the browser on tablet 126 that Seat 1C has particular icon 120 associated therewith, and that vehicle passenger 102 is occupying that seat. Revenue inspector 104 may then engage with vehicle passenger 102 to investigate.

For example, revenue inspector 104 may request that vehicle passenger 102 provide proof of ticket purchase and/or proof of identification (e.g., motor vehicle license). For example, vehicle passenger 102 may allow revenue inspector 104 to observe and scan using tablet 126 an electronic receipt as displayed on smartphone 110, enabling revenue inspector 104 to swiftly verify or validate that vehicle passenger 102 is properly ticketed. In response to the scan, assuming an account associated with vehicle passenger 102 exists and is accessible to on-vehicle server 114 and/or off-vehicle system 116, a picture or graphic of vehicle passenger 102 may be displayed on tablet 126 to enable revenue inspector 104 to confirm the identity of vehicle passenger, etc. In another example, vehicle passenger 102 may allow revenue inspector 104 to observe and scan using tablet 126 a printed paper receipt, to enable revenue inspector 104 to swiftly verify or validate that vehicle passenger 102 is properly ticketed. In both of these scenarios, upon validation, tablet 126 may push that information to on-vehicle server 114 and/or off-vehicle system 116 so that one or both of those elements has the most up-to-date information available. Additional, or alternative, steps or actions may be taken by revenue inspector 104 to validate and/or or sell tickets to passengers, as discussed in further detail below in connection with at least FIG. 3.

As mentioned above, vehicle plan view 100 may be used to illustrate various steps or actions taken by installation engineer 106 to initialize or activate and install passive machine-readable elements at particular locations within vehicle 108. Advantageously, this may at least enable back office systems (e.g., on-vehicle server 114 and/or off-vehicle system 116) to use seat and time data to identify journey and present ticket details sent via a mobile web application as well as other on-vehicle ticketing and validation aspects of the present disclosure. For example, and in no particular order, installation engineer 106 may install tag 112 to vehicle 108 in a location as shown in FIG. 1. It is contemplated that tag 112 may have encoded thereon a plurality of instructions or information, similar to that described above and throughout, and may be implemented in any particular technology, that of which may evolve as technology evolves.

For example, tag 112 may take the form of a 2-dimensional barcode (e.g., UPC-A code, QR Code®), a near-field communication or NFC tag, and etc. Further, installation technique may be a function of type of tag 112. For example, a peel/stick technique may be used to install tag 112, tag 112 itself may be at least partially embedded and/or fixed via fastener to a portion or surface of vehicle 108, and etc. Following installation thereof, installation engineer 106 may use handheld 130 to scan tag 112, and then via a special-purpose software and/or firmware application initialize and/or activate tag 112, so that the same may potentially be utilized or otherwise scanned by vehicle passenger 102 and/or revenue inspector 104 in a manner as discussed above and throughout. To perfect or complete this process, handheld 130 may at least establish a communication link with on-vehicle server 114 that in turn is network-connected to off-vehicle system 116. Relevant initialization information may then be transferred from handheld 130 to off-vehicle system 116 via on-vehicle server 114 so that off-vehicle system 116 and/or on-vehicle server 114 has or have the most up-to-date information available.

Installation engineer 106 may further install tag 132 (as well as tag 124, tag 128, etc.) to vehicle 108 in a location as shown in FIG. 1. It is contemplated that tag 132 while positioned to the back-side of Seat 2B may be affixed anywhere as desired so as to enable a passenger to purchase a ticket or fare, in association with Seat 2A in this example, in a manner as described throughout. In this way, tag 132 may be affixed within vehicle 108 at a location that might be considered most convenient or accessible for passengers of vehicle 108. Similar to tag 112, it is contemplated that tag 132 may have encoded thereon a plurality of instructions or information, similar to that described above and throughout, and may be implemented in any particular technology as desired, that of which may evolve as technology evolves. Further, installation technique may be a function of type of tag 132. Next, following installation thereof, installation engineer 106 may use handheld 130 to scan tag 132, and then initialize and/or activate tag 132 so that the same may potentially be utilized or otherwise scanned by vehicle passenger 102 and/or revenue inspector 104 in a manner as discussed above and throughout.

To perfect or complete this installation or initialization process, handheld 130 may at least establish a communication link with on-vehicle server 114 that in turn is network-connected to off-vehicle system 116. Relevant information may then be transferred from handheld 130 to off-vehicle system 116 via on-vehicle server 114 so that off-vehicle system 116 and/or on-vehicle server 114 has the most up-to-date information available. Additional, or alternative, steps or actions may be taken particular installation engineer 106 to encode and install passive tags at particular locations within the vehicle, as discussed in further detail below at least in connection with FIG. 4.

Figure 2:
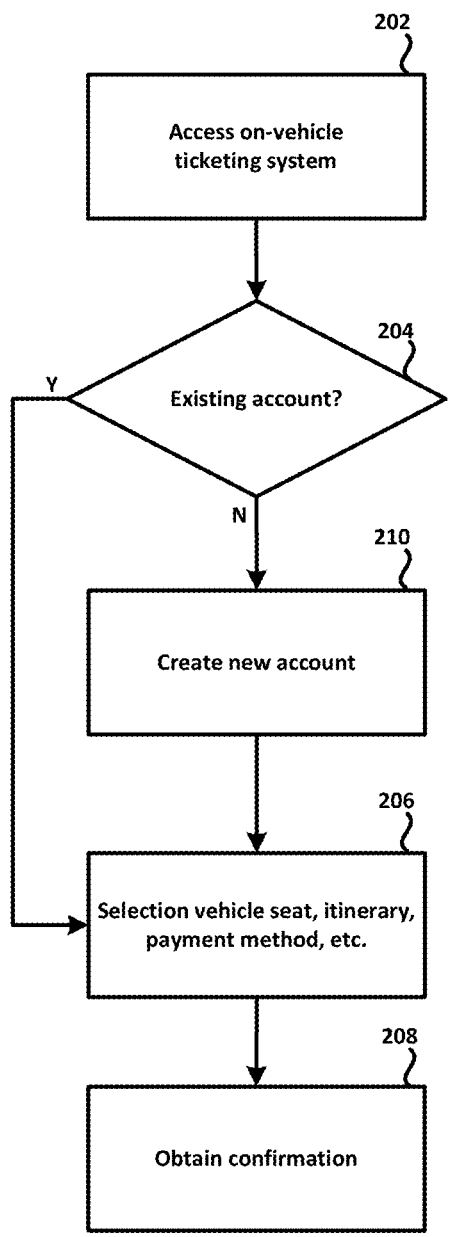
FIG. 2 shows a first method in accordance with the disclosure.

Referring now to FIG. 2, a first example method 200 is shown in accordance with the present disclosure. In general, method 200 may be used to further illustrate various steps or actions taken by vehicle passenger 102 to perfect a ticket purchasing process, in substantially real-time. For example, and with additional reference to FIG. 1, at step 202 vehicle passenger 102 may, following scan of tag 112 (or tag 124, etc.) access using smartphone 110 a website and/or mobile application (collectively, "application") as served to smartphone 110 via on-vehicle server 114. Aside from navigation of the application in general, so as to access various information related to scheduling, pricing, alerts, etc., it is contemplated that the application may permit vehicle passenger 102 to create and access a personal account to enable vehicle passenger 102 to perfect the above-mentioned ticket purchasing process.

For example, at step 204, the application may prompt vehicle passenger 102 to enter or confirm authentication information (e.g., username/password) in order to access a personal account. In event that a personal account associated with vehicle passenger 102 does exist, process flow within method 200 may branch to step 206 where vehicle passenger 102 may interact with the application to select a vehicle seat and/or a commute itinerary in a manner similar to that discussed throughout. Then, at step 208, an electronic receipt may be pushed to smartphone 110 as or for verification of ticket purchase. In event that personal account does not exist, process flow within method 200 may branch to step 210 where the application may guide vehicle passenger 102 through an account set-up process.

For example, vehicle passenger 102 may interact with smartphone 110 to optionally or selectively enter personal identification information (e.g., name, address particulars, photo, driver's license info, photo ID, email address etc.), billing information (e.g., credit card number, debit card number, bank routing numbers, etc.), preference information (e.g., primary/secondary billing methods, route or commute "favorites," etc.), emergency contact and other information (e.g., spouse contact information, medication needs, existing medical conditions, etc.), and perhaps similar information for one or more other individuals (e.g., a family member) who may also ultimately be tied to the new created account. Still other information may be entered as well, and such information may be implementation-specific.

As may be understood from the foregoing discussion in connection with FIG. 1 and FIG. 2, various steps or actions taken by vehicle passenger 102 to perfect a ticket purchasing process in accordance with the present disclosure. Additional context for such steps or actions may be conveyed via the following example scenario. For example, assume vehicle passenger 102 initially arrives at Heathrow airport. While traversing the terminal, vehicle passenger 102 may see or otherwise observe various posters, screens, signs, etc., that indicate a ticket to London may be purchased while on-board the Heathrow Express train. The posters, or like, may exhibit a QR Code®, for example, that has encoded therein a webpage link. When vehicle passenger 102 scans the QR Code® and requests the webpage via smartphone 110 (e.g., via manual input or in response to the scan), the system may redirect vehicle passenger 102, or more specifically the application on smartphone 110, to an appropriate mobile application store (e.g., "AppStore") or inform vehicle passenger 102 that the service is not available for smartphone 110. It is contemplated that the mobile application store has a complete and detailed description of a mobile ticketing application that which when installed enables vehicle passenger 102 to leverage the passenger-related on-vehicle ticketing and validation aspects of the present disclosure.

Next, assume vehicle passenger 102 boards the Heathrow Express train, stows their luggage, and locates a particular seat. Vehicle passenger 102 may see or observe tag 124 (see FIG. 1) affixed to a back portion of a seat immediately in front of the particular seat. It is contemplated that tag 124 may itself exhibit visible instructions (i.e., human-readable instructions) directing vehicle passenger 102 to unlock smartphone 110 and "touch" the same to tag 124 to "PURCHASE OR USE A TICKET." In one example, when vehicle passenger 102 unlocks smartphone 110 an NFC antenna of smartphone 110 may be enabled. Next, vehicle passenger 102 may "swipe" or "touch" smartphone 110 to tag 124 and then smartphone 110 may display a management screen which provides vehicle passenger 102 an option, as a security measure, to proceed to read tag 124 that when selected enables smartphone 110 to access the above-mentioned webpage by virtue of the information encoded to tag 124. Here, it is contemplated that, depending on the operating system of smartphone 110, one or two "touches" may or might be needed to start or instantiate the described processes.

Next, it is contemplated that vehicle passenger 102 may interact with the application to "click" on the URL of the website so that smartphone 110 may connect to the above-mentioned mobile application store. Here, the smartphone 110 may connect to the mobile application store, and the same may include a description of a Heathrow Express ticketing application, for example, or a more generic application that is usable in many different types of implementation-specific scenarios (e.g., taxi cab, subway or "tube," and etc.), that invites vehicle passenger 102 to install the ticketing application. Here, it is contemplated that vehicle passenger 102 may then install the ticketing application to smartphone 110. It is further contemplated that program and device detection may be provided by the mobile application store. In the case of an Android® operating system, a dedicated "HEX" page could offer the ticketing application. Still further, it is contemplated that following installation to smartphone 110, vehicle passenger 102 may open the ticketing application where vehicle passenger 102 may then be instructed to touch smartphone 110 to tag 124 once again.

In this example, once vehicle passenger 102 swipes smartphone 110 to tag 124, smartphone 110 may display details of a seat associated with tag 124 including, continuing with the train or rail car implementation, coach number and current train location. Further, the ticketing application may prompt vehicle passenger 102 whether they would like a one-way or round-trip ticket, adult or child, first class or standard, etc. Here, the ticketing application may advantageously show or display seat information, because it is already encoded to tag 124, and is a feedback indicator for vehicle passenger 102 indicating that everything is working as expected. It is contemplated that location data or current train location may be derived in any number of different ways. For example, directional information may be requested by smartphone 110 from the back-end system (e.g., on-vehicle server 114 and/or off-vehicle system 116). Additionally, or alternatively, smartphone 110 itself could derive location data based upon its own geographic location sensor.

Next, vehicle passenger 102 may interact with the ticketing application to select a particular ticket or ticket type. Here, it is contemplated that the ticketing application installed to smartphone 110 may prompt vehicle passenger 102 to touch smartphone 110 against one or more other tags (e.g., tag 132) as desired, to purchase tickets for other passengers (e.g., a family member), or to select "Continue" to proceed with the ticket purchase process. Next, vehicle passenger 102 may interact with the ticketing application to select payment type. Here, it is contemplated that the ticketing application may prompt vehicle passenger 102 to enter a credit card number or the like, or select from a pick-list, for example, a particular payment method from among a number of different payment methods (e.g., Bank, PayPal, Telefon Billing or MNOPayment, etc.). It is further contemplated that any such payment information as entered may be so via a secure socket layer or SSL module embedded into or within the ticketing application. Other examples are possible, and may be implementation-specific, and further may evolve as technologies related to establishing an encrypted link between a server and browser or mobile application evolves.

Next, vehicle passenger 102 may interact with the ticketing application to enter credit card information, for example, by filling in all relevant data. Vehicle passenger 102 may then select "Continue" and then smartphone 110 may display a confirmation page of the ticket(s) intended for purchase, payment details, and also a selection such as one or more radio buttons to "Buy Now" or "Update." Here, it is contemplated that any menu-driven navigation technique or implementation may be used to enable user-interaction with the ticketing application, along with other elements or interfaces output by smartphone 110. Assuming vehicle passenger 102 selects the "Buy Now" option, smartphone 110 may display a purchased tickets as, for example, an Aztec barcode. Further, as payment is performed online, during the payment a unique pseudo-card number may be generated and delivered to the ticketing application. The ticketing application may store the pseudo-card number and use the same for later payments without issues related to payment card industry or PCI compliance.

Once payment is authorized, an electronic ticket may be delivered to smartphone 110 as a data package rendered as a barcode or as a NFC-Push tag ready to be read by an application installed to tablet 126 used by revenue inspector 104 as discussed above and in further detail below where, for example, particular icon 118 associated with Seat 1C (see FIG. 1) may be switched or switch state to particular icon 120. Here, it is contemplated that the application installed to tablet 126 used by revenue inspector 104 may regularly request updates from back-end systems (e.g., on-vehicle server 114 and/or off-vehicle system 116) via WiFi communication link. Ticket purchase data may then be pushed to tablet 126 when requested. The frequency of such requests may be configurable and periodic (e.g., every 30 seconds, every 1 minute, etc.). Other examples are possible. For example, it is contemplated that the application installed to tablet 126 may be configured and/or arranged so as to enable manual update request to be made by revenue inspector 104.

Still other steps or actions may be taken by vehicle passenger 102 to perfect a ticket purchasing process, in substantially real-time. For example, on a return trip, vehicle passenger 102 may board the Heathrow Express train and select a particular seat. Smartphone 110 may then be unlocked and a particular passive tag affixed in relation to the particular seat may be swiped. The installed ticketing application may open and provide confirmation of seat and carriage number. In this scenario, it is assumed that vehicle passenger 102 had previously purchased a round-trip ticket. The ticketing application may confirm validity of the ticket, and the application installed to tablet 126 used by revenue inspector 104 may be updated so that particular icon 118 associated with Seat 1C is switched to particular icon 120.

Further, on a next or subsequent trip, vehicle passenger 102 may board the Heathrow Express train and select a particular seat. Smartphone 110 may then be unlocked and a passive tag affixed in relation to the particular seat may be swiped. The installed ticketing application may open and provide details of at least the prior journey or trip of vehicle passenger 102. The ticketing application may prompt vehicle passenger 102 to confirm (or not) whether vehicle passenger 102 wants to book the same journey again. If "Yes," the ticketing application may take payment by the same method as previously selected, without requiring further input other than selection of "Buy It" from or by vehicle passenger 102 for example. The credit card number though may be masked so that only a bank identification number or BIN and last four (4) digits are shown, but, in some examples, card verification code or CVC entry may be required as a security measure. The ticketing application may confirm ticket validity, and the application installed to tablet 126 used by revenue inspector 104 may be updated so that particular icon 118 associated with Seat 1C is switched to particular icon 120. If "No," the ticketing application may take vehicle passenger 102 through a ticket purchasing process similar to that discussed above.

Figure 3:
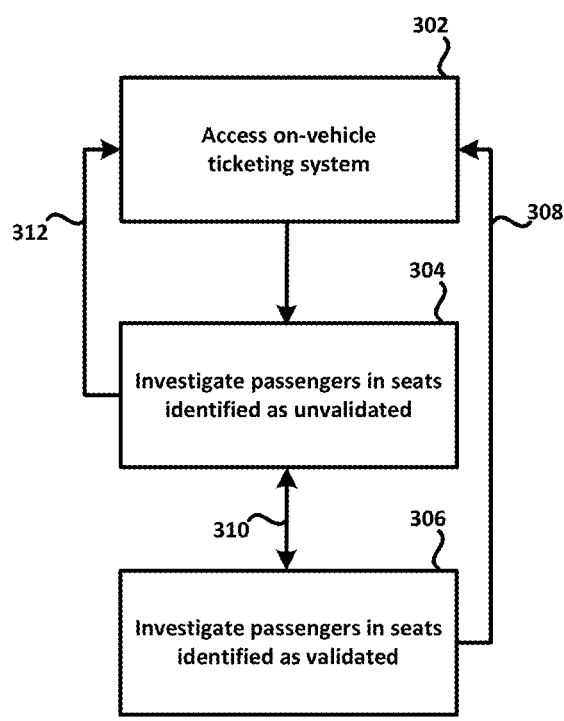
FIG. 3 shows a second method in accordance with the disclosure.

Referring now to FIG. 3, a second example method 300 is shown in accordance with the present disclosure. In general, method 300 may be used to further illustrate various steps or actions taken by revenue inspector 104 to validate and/or or sell tickets to passengers. For example, and with additional reference to FIG. 1, at step 302 revenue inspector 104 may, following scan of tag 112 access using tablet 126 a website and/or mobile application (collectively, "application") as served to tablet 126 via on-vehicle server 114. In other examples, data as received by tablet 126 may be received from another, different communication connection such as a cellular network communication connection for example.

Aside from navigation of the application in general, so as to access various information related to scheduling, pricing, alerts, etc., it is contemplated that the application may permit revenue inspector 104 to access up-to-date ticketing information summarized via a map of vehicle 108, similar to vehicle plan view 100 as shown in FIG. 1, in which each seat within vehicle 108 not having a purchased ticket associated therewith may be identified by particular icon 118, and each seat within vehicle 108 having a purchased ticket associated therewith may be identified by particular icon 120. Such information may enable revenue inspector 104 to quickly prioritize inspection tasks associated with validating and/or selling tickets to passengers.

For example, at step 304, revenue inspector 104 may choose to initially identify potential non-ticketed passengers and then investigate accordingly, so as to prevent fraud and/or possible fare evasion, intended or otherwise. For example, revenue inspector 104 may interact with tablet 126 to identify each seat within vehicle 108 not having a purchased ticket, i.e., via identification of particular icon 118, associated therewith and that also has a particular individual "sitting" for example in a particular seat. Here it is contemplated that revenue inspector 104 may then engage with that passenger to investigate. Assuming that the passenger does not have a smartphone or other WiFi-enabled device, revenue inspector 104 may take measures to assist that passenger to purchase a ticket for their commute. For example, revenue inspector 104 may use tablet 126 to scan a particular tag associated with the particular seat tag 128, and then assist the particular passenger to select or otherwise agree to particular commute fare terms, select or otherwise enter payment information, and etc. Revenue inspector 104 may further use tablet 126 to provide a receipt to the passenger as evidence of proof of ticket purchase. Furthermore, seat status may be switched or changed in a manner similar to that described above in which particular icon 118 may be switched or changed to particular icon 120.

Referring now only to FIG. 3, the example method 300 may in general be considered a continuous process, as indicated by the respective loop branches 308, 310, 312, whereby revenue inspector 104 may as desired swipe or scan particular carriage-specific tags (e.g., tag 112) during "rounds," as in the example train or rail car implementation, and then utilize tablet 126 to firstly investigate passengers in seats identified as potentially unvalidated, so as to prevent fraud and/or possible fare evasion, as described at step 304, and then secondly investigate passengers in seats identified as potentially validated or at least pre-validated. For example, at step 306, revenue inspector 104 may interact with tablet 126 to identify each seat within vehicle 108 having a purchased ticket (e.g., via identification of particular icon 120) associated therewith and that also has a particular individual sitting for example in a particular seat. Here, it is contemplated that revenue inspector 104 may then engage with that passenger to investigate.

For example, revenue inspector 104 may request that a particular passenger provide proof of ticket purchase and/or proof of identification. For example, revenue inspector 104 may use tablet 126 to scan an electronic receipt as displayed on a handheld device associated with the particular passenger, enabling revenue inspector 104 to swiftly verify or validate that the particular passenger is properly ticketed. In some examples, tablet 126 may display in response to the scan a picture or graphic of the particular passenger to enable revenue inspector 104 to confirm identity of the passenger, and etc. As another example, revenue inspector 104 may use tablet 126 to scan a paper receipt provided by the particular passenger, also enabling revenue inspector 104 to swiftly verify or validate that the passenger is properly ticketed.

As may be understood from the foregoing discussion in connection with FIG. 1 and FIG. 3, various steps or actions may be taken by revenue inspector 104 to validate and/or sell tickets to passengers in accordance with the present disclosure. Additional context for such steps or actions may be conveyed via the following discussion. For example, and as discussed throughout, it is contemplated that revenue inspector 104 may use tablet 126 to scan a particular carriage-specific tag (e.g. tag 112) so that a map may be displayed by tablet 126, similar to vehicle plan view 100, in which each available seat within vehicle 108 may be identified by particular icon 118, and each unavailable seat within vehicle 108 may be identified by particular icon 120. In particular, it is contemplated that "vicinity tags" may be installed inside or at or near an entrance of each coach, as in the context of a train or rail car implementation. Those tags may have a unique ID that may be identified with a specific piece of coaching stock (e.g., "Car A").

Further, it is contemplated that several different layouts of internal seating may exist. Here, each different layout may have an associated map created for use or access on or by tablet 126. Additionally, in practice, the "inspection application" of tablet 126 may regularly request updates from the back office systems via an on-board WiFi link, and the back office systems may post ticket purchase data to the tablet 126 when requested. As mentioned above, the frequency of such requests may be configurable, and it may be most effective to set an update time to about less than one (1) minute. Further, any of a plurality of additional information may be pushed to tablet 126. For example, it is contemplated that an infrared or other type of sensor may be incorporated within or at least positioned near respective seat tags (e.g., tag 132) and will be able to detect whether a passenger is sitting in the seat facing a respective tag. Such information may be pushed to tablet 126 so that the seat facing the respective tag may be identified within the inspection application running on tablet 126 as having particular icon 120 associated therewith.

Still further, it is contemplated that as revenue inspector 104 enters a new carriage, tablet 126 may detect a particular vicinity tag, and the same may be installed far enough inside each coach or otherwise separated from other vicinity tags so that tablet 126 may to recognize that it has moved from one coach to another, and then tablet 126 may automatically display a "new" map of the newly entered carriage or car, with seats colored in red or green or otherwise having particular icon 118 or particular icon 120 associated therewith. Additionally, it is contemplated that the inspection application executing on tablet 126 may permit revenue inspector 104 to "flick" backward to a previous carriage diagram if wished, or even "flick" forward to a next carriage diagram if wished. Other functionality of the inspection application is contemplated as well. For example, whenever revenue inspector 104 validates or sells a ticket, revenue inspector 104 may set a particular seat "color" on the displayed diagram to "green" by touching the seat and then selecting from a menu that offers the options: "PrePurchased Ticket" or "On-Board Ticket."

A further menu option of "No Ticket" may allow revenue inspector 104 to set the seat image "flashing red." Here, the general whereabouts of the ticketless passenger (e.g., the passenger generally associated with the flashing red indicator) may be forwarded to station staff at a next stop, and/or a subsequent next step, and etc., along the commuter line. Still further, the inspection application installed to tablet 126 may be configured to include e-mail addresses where ticketless passenger details can be sent. The inspection application installed to tablet 126 may then automatically use this address(es) as the recipient of an e-mail with the seat number of a ticketless passenger. This function may also allow a photo of the passenger to be attached. For example, revenue inspector 104 may use a camera integrated within or to tablet 126 to take a picture of the passenger generally associated with the flashing red indicator, or any passenger and/or passenger ticket for that matter, regardless of whether the ticket is magnetic stripe, paper barcode, or mobile barcode. The inspection application installed to tablet 126 may validate the ticket, possibly in light of a communication sequence between tablet 126 and on-vehicle server 114 and/or off-vehicle system 116, and based upon the picture display on a screen of tablet 126 whether the ticket is valid or not.

Still other functionality of the inspection application is contemplated as well. For example, inspection application installed to tablet 126 may be configured to leverage character recognition software and a known ticket layout map to automatically (i.e., without user input of a specific command to instantiate the process) interpret a photograph of a magnetic ticket. The details of the ticket may then be checked against the same ticket validation rules used to check barcode ticket contents. It is contemplated that application software will recognize 2D barcodes in a photo image and convert it into the representative data stream. This data may then be checked against particular ticket validation rules for authenticity, date and time validity, and geographical validity. Still further, the barcode may also be checked against a remote list of pre-used and therefore invalid barcodes. Here, if the ticket is not valid the inspection application may suggest a reason as to why so that revenue inspector 104 may assist or help the passenger.

In practice, when revenue inspector 104 chooses to inspect the ticket, revenue inspector 104 may request the passenger to provide a visual inspection of their mobile device. It is contemplated that the mobile may show or display an Aztec barcode and ticket information. Here, Aztec or other barcode symbologies are encoded by standard software and, to enable verification, the passenger may unlock the mobile device wherein it is assumed that the barcode is displayed and the mobile device is in inspection mode. In this mode, NFC-enabled phones present the data also as "NDEF-Push." The data may contain: (1) Seat/coach number, ticket type, direction (e.g., for every booking); (2) timestamp; (3) last 4 digits of bankcard (optional); RSA (cryptosystem) signature. Further, revenue inspector 104 has inspection application running on tablet 126 and may then "touch" tablet to the mobile device to confirm whether the ticket is valid. To confirm ticket validity one or more rules may apply, such as, for example; (1) valid or "good" signature; (2) timestamp was established within last 30 minutes, or more, or less; (3) a list with seat/coach number and ticket type related to the inspected barcode/NFC data is presented to revenue inspector 104. Other examples are possible, and is contemplated that the rules may evolve as needed or desired.

If the ticket is found to be valid, revenue inspector 104 may move on to a next inspection during the course of rounds. If found invalid, revenue inspector 104 may leverage tablet 126 to sell a standard barcode ticket to the passenger, transferring it to the mobile device of the passenger or possibly printing to paper. In another example, tablet 126 may be configured and/or arranged to deliver barcode tickets to a mobile phone using an SMS and/or email message, via Bluetooth®, NFC communication, and etc. With the latter delivery mechanisms, it assumed that the mobile phone is compatibly configured to receive and render the message.

Figure 4:
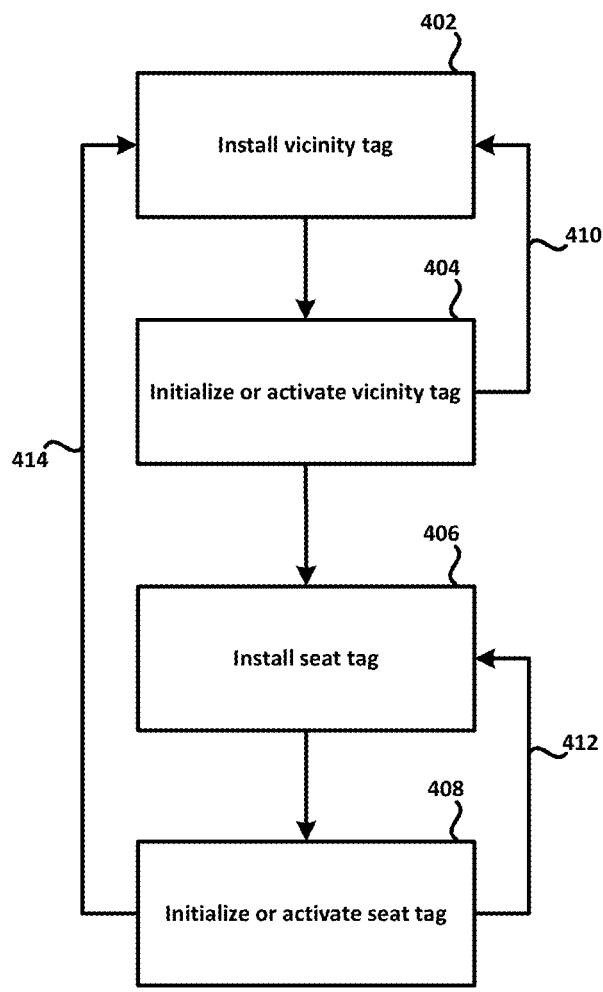
FIG. 4 shows a third method in accordance with the disclosure.

Referring now to FIG. 4, a third example method 400 is shown in accordance with the present disclosure. In general, method 400 may be used to further illustrate various steps or actions taken by installation engineer 106 to initialize or activate and install passive machine-readable elements at particular locations within vehicle 108. For example, and with additional reference to FIG. 1, at step 402 installation engineer 106 may install a particular vicinity tag (e.g., tag 112) inside or at or near an entrance of a particular coach or carriage, as in the context of a train or rail car implementation. In general, the vicinity tag may have encoded thereon a plurality of instructions or information, similar to that described above and throughout, and may be implemented in any particular technology, that of which may evolve as technology evolves. Examples include a UPC-A code, a QR Code®, an NFC tag, and etc. The actual installation may be implemented in many different ways. For example, a peel/stick technique may be used to install the vicinity tag, or the tag itself may be at least partially embedded and/or fixed via fastener to a particular portion or surface of the coach or carriage.

Next, at step 404, installation engineer 106 may use or handheld 130 to scan the vicinity tag and then via a special-purpose software and/or firmware application initialize and/or activate the vicinity tag so that the same may potentially be utilized or otherwise scanned by vehicle passenger 102 and/or revenue inspector 104 in a manner as discussed above and throughout. To perfect or complete this process, handheld 130 may at least establish a communication link with on-vehicle server 114 that in turn is network-connected to off-vehicle system 116. Relevant initialization information may then be transferred from handheld 130 to off-vehicle system 116 via on-vehicle server 114 so that off-vehicle system 116 and/or on-vehicle server 114 has the most up-to-date information available.

At step 406, installation engineer 106 may install a particular seat tag (e.g., tag 124) at a location at or near a particular seat that might be considered "most" convenient or accessible for passengers of the coach or carriage. For example, the particular seat tag may installed to a seat immediately forward of the particular, similar to that shown and described above in connection with FIG. 1. In general, the seat tag may have encoded thereon a plurality of instructions or information, similar to that described above and throughout, and may be implemented in any particular technology, that of which may evolve as technology evolves. Examples include a UPC-A code, a QR Code®, an NFC tag, and etc. The actual installation may be implemented in many different ways. For example, a peel/stick technique may be used to install the vicinity tag, or the tag itself may be at least partially embedded and/or fixed via fastener to a particular portion or surface of the coach or carriage.

Next, at step 408, installation engineer 106 may use or handheld 130 to scan the seat tag and then via a special-purpose software and/or firmware application initialize and/or activate the seat tag so that the same may potentially be utilized or otherwise scanned by vehicle passenger 102 and/or revenue inspector 104 in a manner as discussed above and throughout. To perfect or complete this process, handheld 130 may at least establish a communication link with on-vehicle server 114 that in turn is network-connected to off-vehicle system 116. Relevant initialization information may then be transferred from handheld 130 to off-vehicle system 116 via on-vehicle server 114 so that off-vehicle system 116 and/or on-vehicle server 114 has the most up-to-date information available.

Referring now only to FIG. 4, the example method 400 may in general be considered a continuous process, as indicated by the respective loop branches 410, 412, 414, whereby installation engineer 106 may repeat the described processes to "fully" equip the particular coach or carriage, and then move on to another coach or carriage during installation "rounds," as in the example train or rail car implementation. Other examples are possible, and installation techniques may vary or differ depending on implementation (e.g., taxi cab, subway or "tube," and etc.).

As may be understood from the foregoing discussion in connection with FIG. 1 and FIG. 4, various steps or actions may be taken by installation engineer 106 to initialize or activate and install passive machine-readable elements at particular locations within a vehicle in accordance with the present disclosure. Additional context for such steps or actions may be conveyed via the following discussion. For example, and as discussed throughout, it is contemplated that installation engineer 106 may during an installation process board a particular coach or carriage and retrieve one or more vicinity tags out of their case. In some examples, installation engineer 106 may then "unpeel" a sticky backing from the vicinity tag(s) and "press" the same at or near a doorway of the carriage. Next, installation engineer 106 may unlock NFC-enabled handheld 130 and open a dedicated Heathrow express installation application, for example to continue with the above-mentioned implementation-specific scenario.

It is contemplated that the dedicated application may prompt or provide installation engineer 106 with an installation menu that may include selections "Vicinity Tag Configuration" and "Seat Tag Configuration." In the present example, installation engineer 106 may select "Vicinity Tag Configuration" wherein handheld 130 may then prompt installation engineer 106 to type in a carriage serial number or other relevant unique identification information. In response, handheld 130 may display an internal map of the carriage. Here, it is further contemplated that a set of representative seating maps may be developed for access by handheld 130 wherein each carriage in the fleet may be logged and associated with a correct and up-to-date map. In general, the maps and a relationship table may be copied to each instance of tablet 126 so that all revenue inspectors have access to correct and up-to-date existing maps.

Next, installation engineer 106 may proceed to install seat tags. For example, installation engineer 106 may return to the installation menu to select "Seat Tag Configuration" wherein handheld 130 may then prompt installation engineer 106 to select a particular seat and/or seat number. Here, it is contemplated that installation engineer 106 may during an installation process enter the particular coach or carriage and retrieve a particular seat tag out of their case. In some examples, installation engineer 106 may then "unpeel" a sticky backing from the seat tag and "press" the same at or near a seat immediately forward of the particular seat, that is, on the backside of an immediately forward seat. Next, installation engineer 106 may unlock NFC-enabled handheld 130 and open the dedicated Heathrow express installation application, and then "touch" tablet 126 to the newly affixed seat tag.

In this example, it is contemplated that tablet 126, or more specifically the dedicated application, acknowledges the seat tag and displays information such as: (1) configuration data; (2) coach number; (3) seat number; (4) tag address. Next, the dedicated application may prompt the installation engineer 106 to select another seat so that the process may continue. In the background, tablet 126 may connect to the back end system (e.g., on-vehicle server 114 and/or off-vehicle system 116) and transfer the configuration data, coach number, seat number, and tag address thereto. In some examples, one or more of the configuration data, coach number, seat number, and tag address is written in the seat tag itself.

Figure 5:
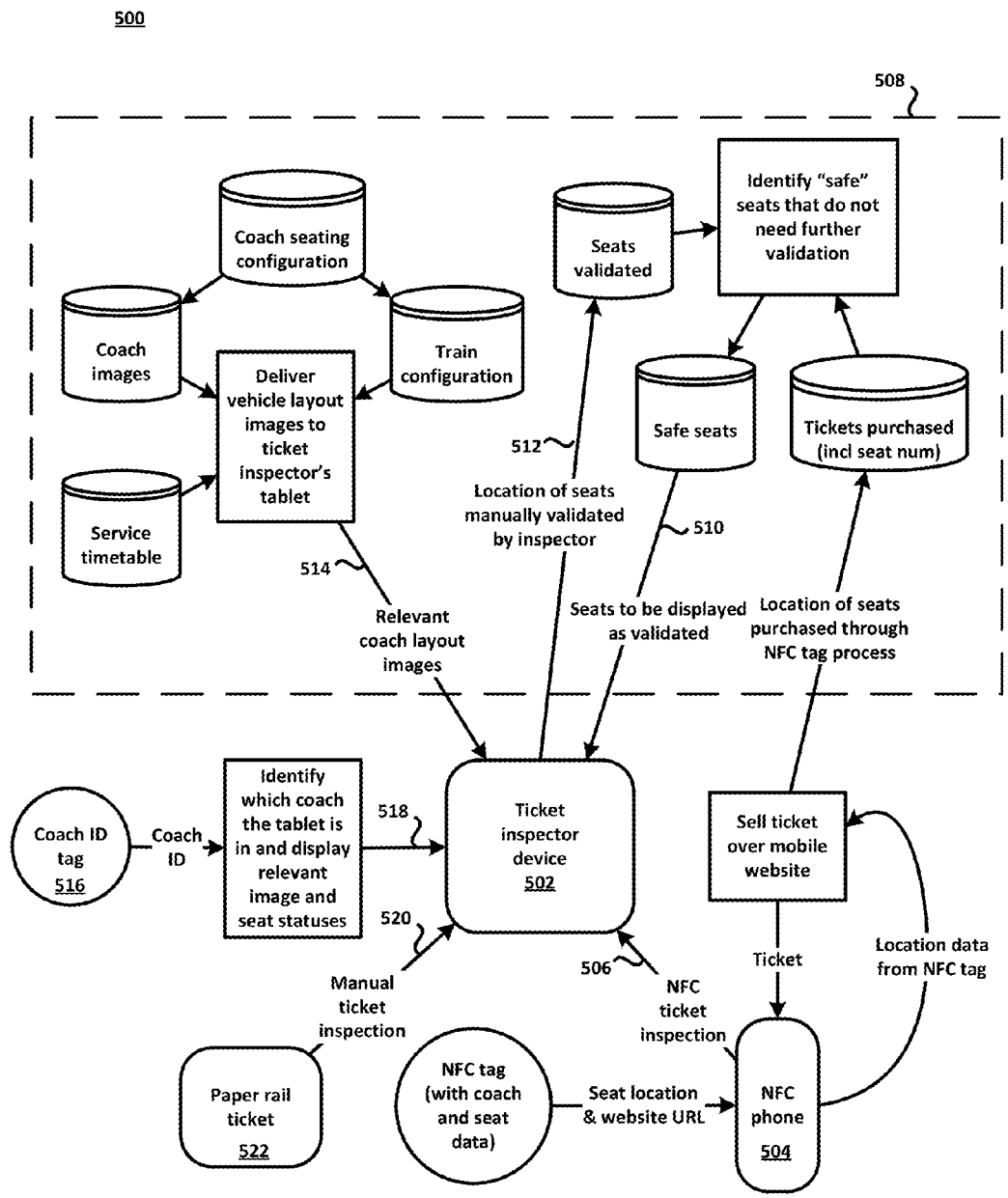
FIG. 5 shows a first information flow in accordance with the disclosure.

Referring now to FIG. 5, a first example information flow 500 is shown in accordance with the disclosure. In general, the central actor within first information flow 500 may be considered to be tablet 126, shown as tablet 502 in FIG. 5, and focus is placed on its role in the on-vehicle ticketing and validation aspects of the present disclosure. This however does not detract from the roles played by other elements or component within FIG. 5. Further, such an implementation as discussed in connection with FIG. 5, and throughout, while innovatively using NFC tags for example, may add value by effectively allowing for ticket pre-validation so that revenue inspector 104 does not have perform that task. Additionally, ticket inspection procedures may be substantially simplified, reducing costs, increasing efficiencies, and potentially reducing or minimizing unauthorized travel by directing revenue inspector 104 to "unvalidated" seats.

Some core inputs to tablet 502 include known validated seats, seat maps, and information as to which specific vehicle or rail car that tablet 126 (and revenue inspector 104) is currently located in, to help direct the revenue inspector 104 to people whose seats are not marked as "safe" or "valid" or "confirmed" on a screen of handheld 130. Further benefits and efficiencies may be realized from passenger self-validation by virtue of self-check-in via reading of a particular seat tag with their mobile device, and then purchasing a ticket on their own in a manner as discussed throughout. In general, the on-vehicle ticketing and validation aspects of the present disclosure in many instances may significantly reduce the workload of revenue inspector 104. Other examples and associated advantages are however contemplated. For example, in an alternate example, handheld 130 may take the form of a wearable device (e.g., pair of glasses, wristwatch, etc.) that among things includes or exhibits augmented visual functionality that may recognize human shapes in unvalidated seats and highlight them in red, for example. An example of such an implementation is discussed in further detail below in connection with FIG. 6.

As shown in FIG. 5, tablet 502 is in a first aspect configured and/or arranged to communicate with smartphone 110, shown as mobile device 504 in FIG. 5, to receive via link 506 particular passenger ticket information, in a manner similar to that described throughout (e.g., via scan of an electronic ticket). Further, tablet 502 is in a second aspect configured and/or arranged to communicate with on-vehicle server 114 and/or off-vehicle system 116, shown as back-end 508 in FIG. 5, to receive via link 510 particular seat validation information, in a manner similar to that described throughout (e.g., data associated with particular icon 120). In a similar way, tablet 502 is in a third aspect configured and/or arranged to communicate with back-end 508 to send via link 512 different particular seat validation information, in a manner similar to that described throughout (e.g., via confirmation of validity via manual input to tablet 502).

In general, such information communicated to back-end 508 via link 512 may be derived from data received by tablet 502 via link 506 as discussed above, and also may be derived from data received by tablet 502 via link 520 as shown in the bottom left hand corner of FIG. 5, based on manual ticket inspection of paper ticket 522. Next, tablet 502 is in a fourth aspect configured and/or arranged to communicate with back-end 508 to receive via link 514 particular vehicle layout information, in a manner similar to that described throughout (e.g., data associated with a map similar to vehicle plan view 100 of FIG. 1). In a similar way, tablet 502 is in a fifth aspect configured and/or arranged to communicate with vicinity tag 112, shown as tag 516 in FIG. 5, to receive via link 506 particular passenger carriage or car-related information, in a manner similar to that described throughout (e.g., via scan or swipe, etc., of vicinity tag 112). Example, non-exhaustive, features and/or functionality associated with components or elements associated with information flow via the various links in FIG. 5 are identified in that figure, each of which may be labeled with a unique part number as needed or desired.

Figure 6:
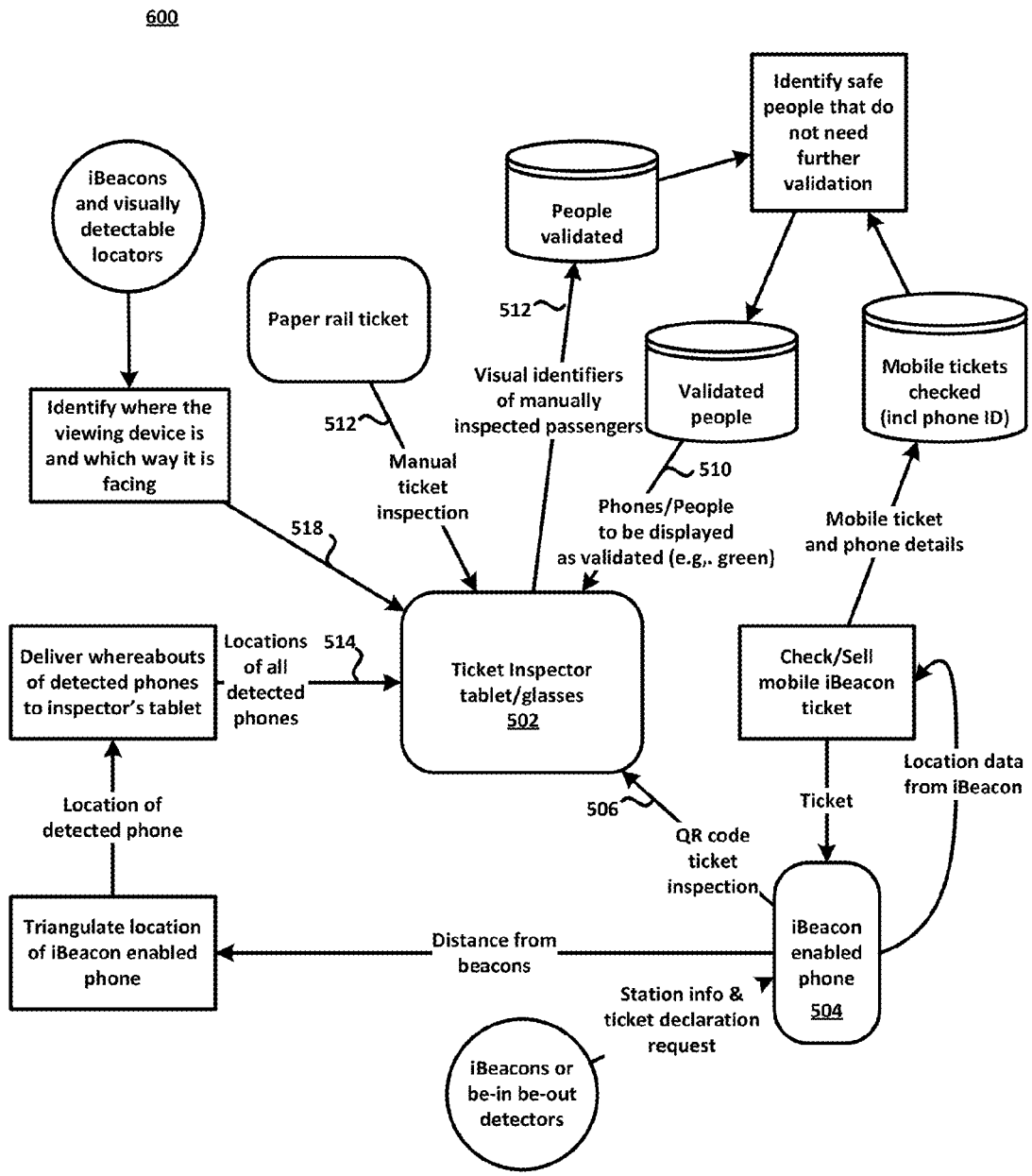
FIG. 6 shows a second information flow in accordance with the disclosure.

Referring now to FIG. 6, a second example information flow 600 is shown in accordance with the disclosure. In general, second information flow 600 is in many aspects similar to first information flow 500 as discussed above in connection with FIG. 5. For example, second information flow 600 and first information flow 500 have similar components or elements such as, the tablet 502 and mobile device 504, and also respective links 506, 510, 512, 514, 518, and 520. Second information flow 600 and first information flow 500 though are different in implementation details.

Specifically, second information flow 600 in implementation may leverage iBeacon® detection technology, an indoor proximity system by Apple, Inc. of Cupertino, Calif., and/or leverage Be-In-Be-Out detection technology, similar to as that described in U.S. patent application Ser. No. 12/952,706, now published as U.S. Patent Application Publication Number 2011/0153495, assigned to Cubic Corp. of San Diego, Calif., wherein tablet 502 may in some examples correspond to a wearable device (e.g., pair of glasses, etc.) that is configured and/or arranged so that a revenue inspector (e.g., revenue inspector 104) may compare what they "see" regarding data about "detected" tickets in addition to their triangulated position. Example, non-exhaustive, features and/or functionality associated with components or elements associated with information flow via the various links in FIG. 6 are identified in that figure, each of which may be labeled with a unique part number as needed or desired.

Figure 7:
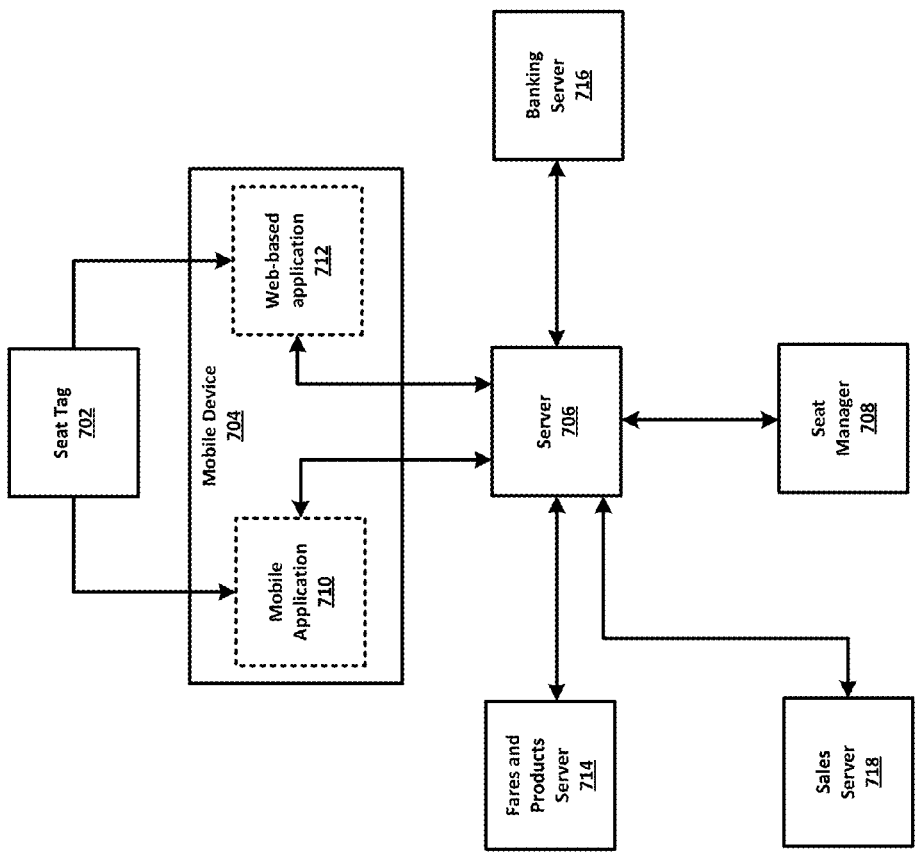
FIG. 7 shows a system architecture in accordance with the disclosure.

Referring now to FIG. 7, an example system architecture 700 is shown in accordance with the disclosure. The example components or elements shown in FIG. 7 may be similar and perform similar functions in many ways to like elements described above in connection with FIG. 1. For example, system architecture 700 as shown includes a number of "on-vehicle" components including seat tag 702, mobile device 704 (e.g., assuming an owner of mobile device 704 is in "on-vehicle"), server 706, and seat manager 708. Mobile device 704 is shown to include or exhibit mobile application 710 and web-based application 712. System architecture 700 as shown further includes a number of "off-vehicle" components including fares and products server 714, banking server 716, and sales server 718. Other examples are possible as well. For example, in some examples, functionality implemented by seat manager 708 may wholly or at least partially be incorporated into or by server 706. Similarly, in some examples, functionality implemented by products server 714, banking server 716, and sales server 718 may wholly or at least partially be incorporated into or by server 706, and possibly wholly or at least partially incorporated into one of those own components. For example, fares and products server 714 and sales server 718 might be incorporated in a single server entity.

In general, the central actor within system architecture 700 is server 706, and focus is placed on its role in the on-vehicle ticketing and validation aspects of the present disclosure. This however does not detract from the roles played by other elements or component within FIG. 7. In practice, mobile device 704 may be used to perfect a ticket purchasing process in substantially real-time and, following a scan or touch of seat tag 702, one or more of mobile application 710 and web-based application 712 may be in communication with server 706, to allow or permit an individual to interact with mobile device 704 to purchase a ticket in a manner similar to that discussed above in connection with at least FIGS. 1-2.

For example, the individual may interact with mobile application 710 to select a particular seat and itinerary based on data received by server 706 from fares and products server 714, and then transferred to mobile device 704 from server 706. Upon selection by the individual of a particular seat and itinerary, using mobile device 704, server 706 may report sales data to sales server 718, that which is not necessarily associated with a particular banking instruction, and also negotiate with banking server 716 to conduct the actual financial transaction related to ticket purchase. Next, server 706 may communicate with seat manager 708 to update status of the particular seat as "occupied" or "validated," etc., so that when revenue inspector 104 observes status of the particular seat via tablet 126, that particular seat may be marked or indication as "occupied" or "validated" (e.g., by particular icon 120).

Figure 8:
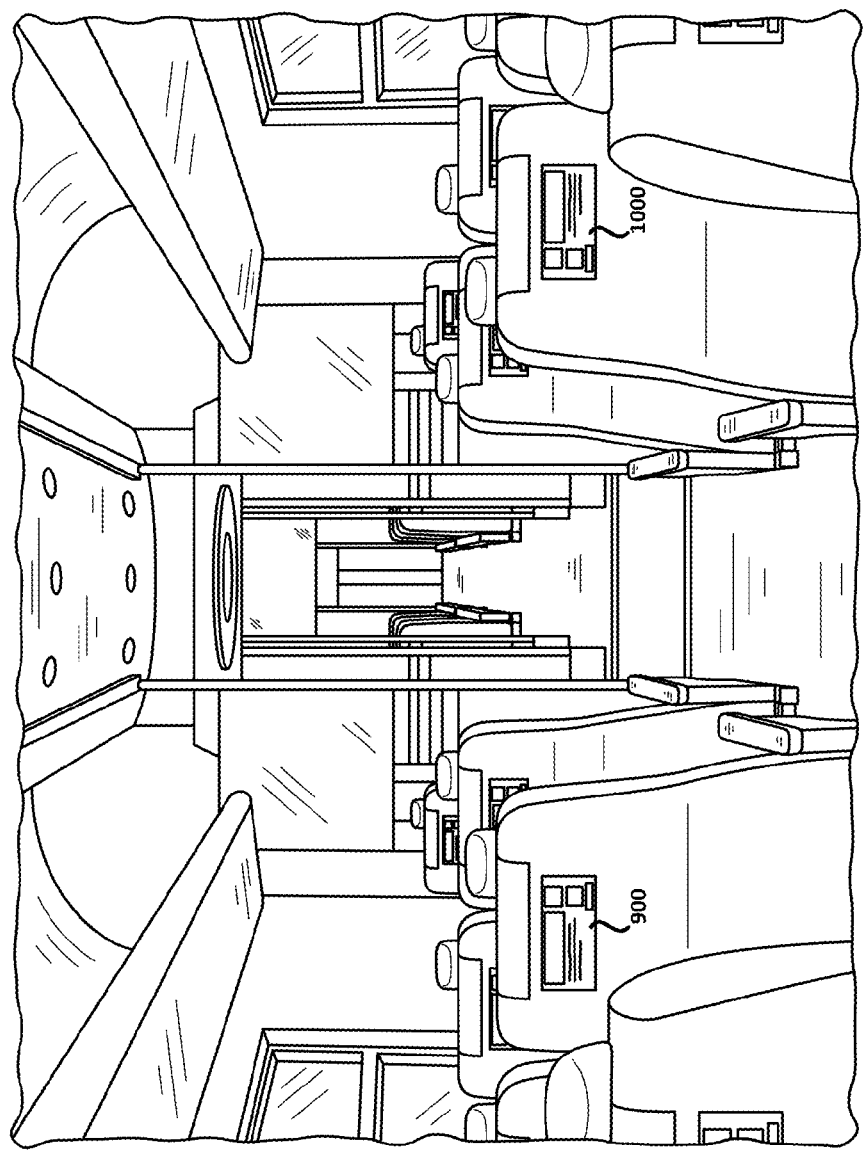
FIG. 8 shows an internal vehicle view in accordance with the disclosure.
Figure 9:
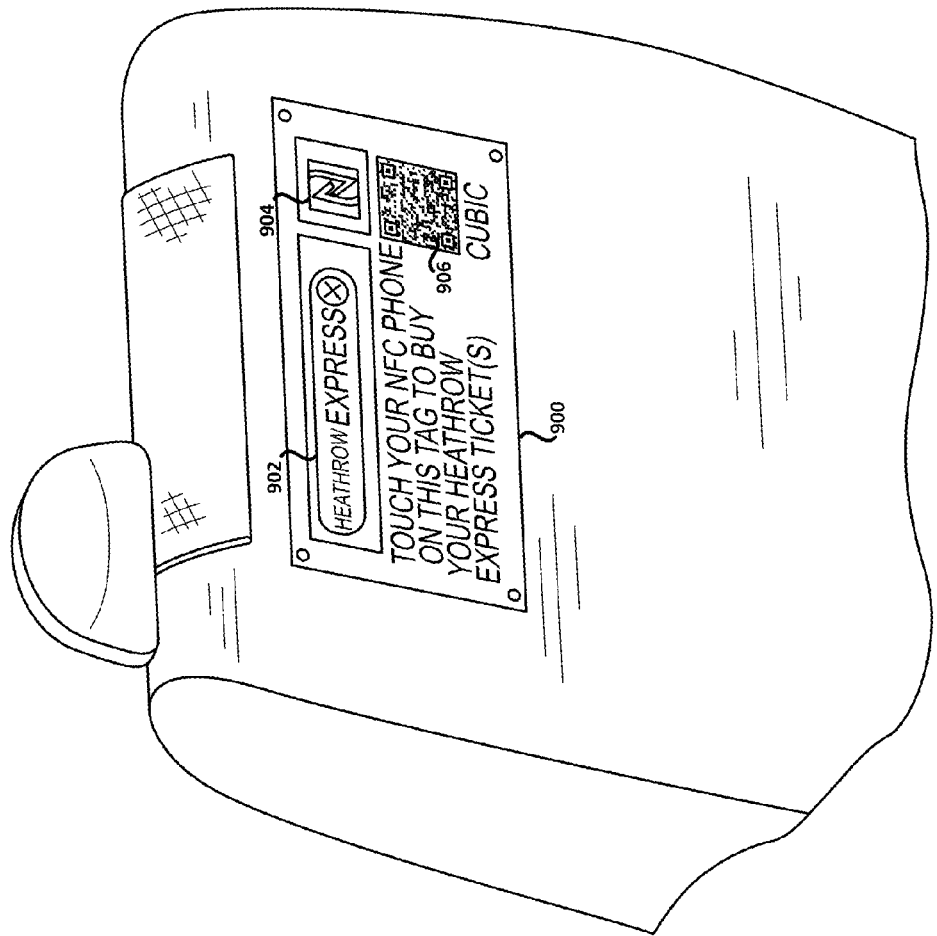
FIG. 9 shows a seat tag in accordance with the disclosure.
Figure 10:
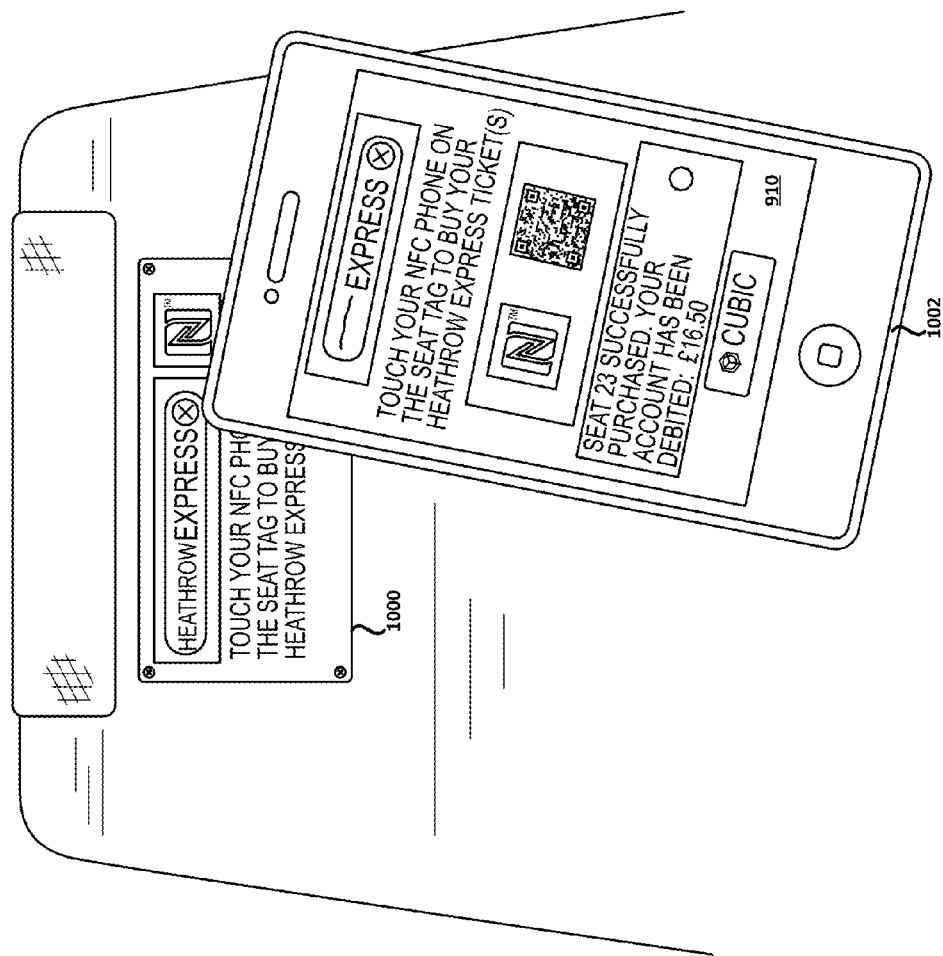
FIG. 10 shows a seat tag and mobile device in accordance with the disclosure.
Figure 11:
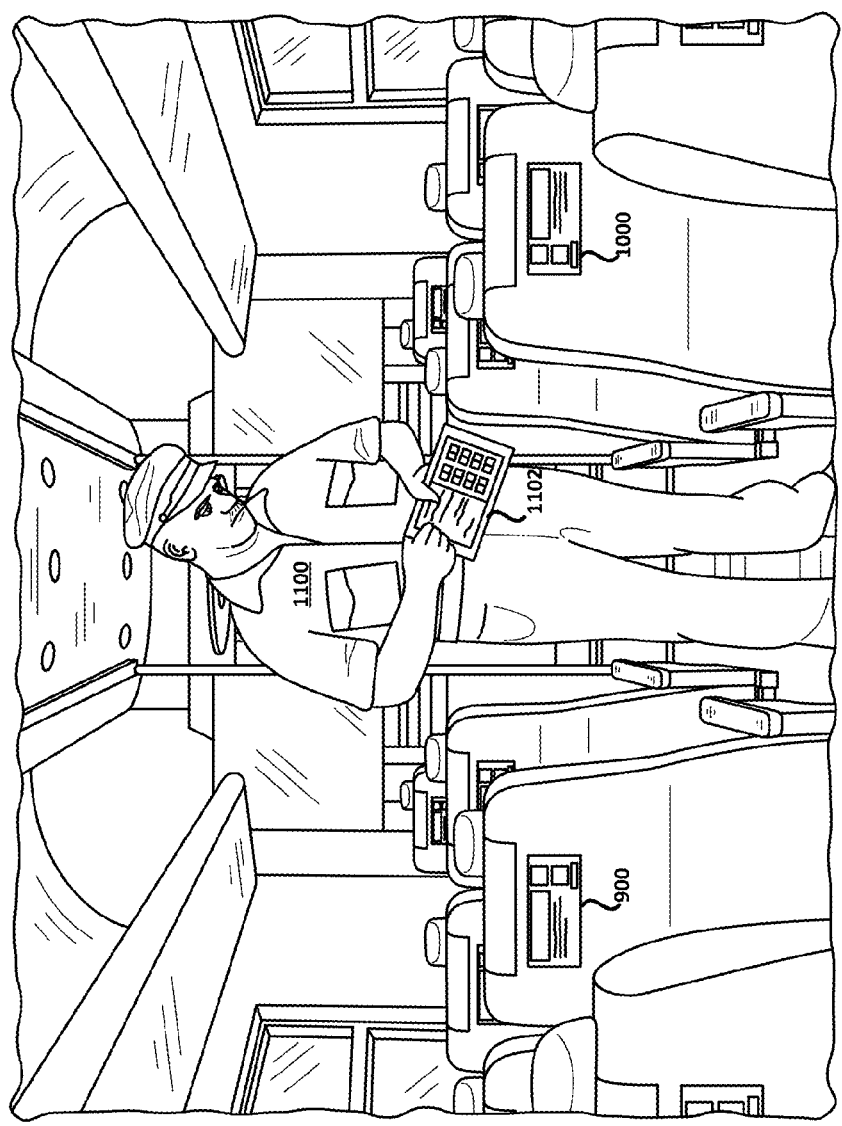
FIG. 11 shows a revenue inspector with tablet in accordance with the disclosure.
Figure 12:
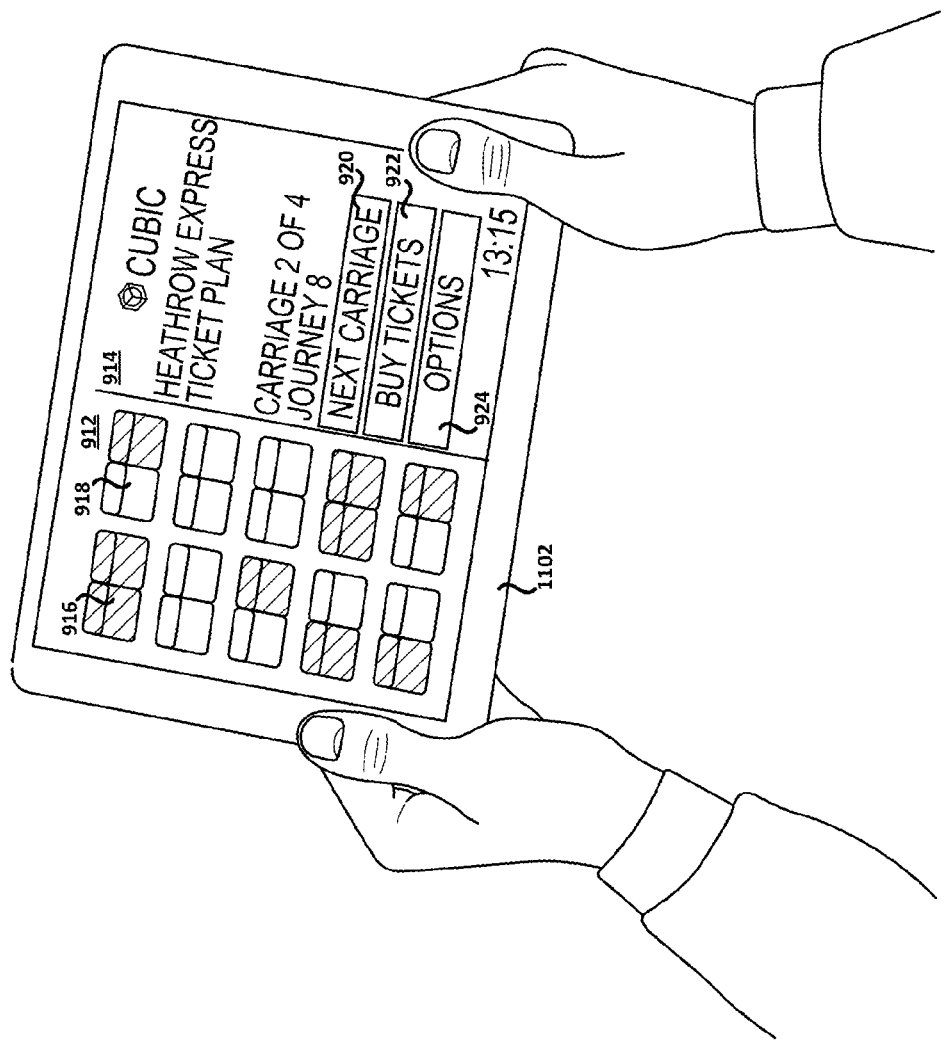
FIG. 12 shows the tablet of FIG. 11 in further detail.

Referring now collectively to FIGS. 8-12. FIG. 8 shows an internal vehicle view 800 in accordance with the disclosure, FIG. 9 shows a particular seat tag 900 in accordance with the disclosure, FIG. 10 shows another particular seat tag 1000 and mobile device 1002 in accordance with the disclosure, FIG. 11 shows a revenue inspector 1100 with tablet 1102 in accordance with the disclosure, and FIG. 12 shows tablet 1102 of FIG. 11 in detail. In general, seat tag 900 and seat tag 1000 are affixed to a back portion or section of a particular seat within a train car, and each include or exhibit an indicator 902, that indicates that train car is but one car of the "Heathrow Express" train, an NFC tag 904, and a 2D barcode 906 (see FIG. 9).

In practice, mobile device 1002 may be used to scan one of NFC tag 904 and 2D barcode 906, perhaps based upon configuration of mobile device 1002, to access ticketing application 910 as shown in FIG. 10. Here, ticketing application 910 may be navigated so as to allow for purchase of a ticket, similar to that described throughout, that is associated with a particular seat and, ticketing application 910 may indicate such including, for example, "SEAT 23 SUCCESSFULLY PURCHASED. YOUR ACCOUNT HAS BEEN DEBITED £ 16.50." Also, tablet 1102 may be used by revenue inspector 1100 to validate tickets and/or or sell tickets to passengers, as discussed throughout, and may also display map 912 and interface 914 as shown in FIG. 12. In general, map 912 may provide a first indication 916 (e.g., stipple-shading or "coloring") as to occupied or pre-validated seats, and also a second indication 918 (e.g., no stipple-shading or no "coloring") as to unoccupied or non-pre-validated seats. It will be appreciated that such information may enable revenue inspector 1100 to quickly or swiftly prioritize inspection tasks associated with validating and/or selling tickets to passengers.

Additionally, interface 914 may update to include information such as which carriage revenue inspector 1100 is currently in (e.g., "CARRIAGE 2 of 4"), journey or trip number for the current day (e.g., "JOURNEY 8"). Interface 914 may further exhibit a number of selections such as a first radio button 920 that may enable revenue inspector 1100 to change view of map 912 (e.g., "NEXT CARRIAGE"), a second radio button 922 that may enable revenue inspector 1100 to assist passengers in purchasing tickets (e.g., "BUY TICKETS"), and a third radio button 924 that may enable revenue inspector 1100 to assist passengers in validating tickets (e.g., "OPTIONS"). Still other functionally may be offered or otherwise made available by interface 914 so as to enable revenue inspector 1100 to quickly or swiftly prioritize inspection tasks associated with validating and/or selling tickets to passengers, as discussed throughout.

The present disclosure is directed to or towards a system and method to enable a passenger of a vehicle to enter or board the vehicle without necessarily having previously purchased, or pre-purchased, a ticket or fare, and then to "swipe" or "touch" their handheld device to or against a passive tag or other machine-readable element positioned within the vehicle, the same being encoded with information that identifies at least a seat number of the vehicle, and then in light of said encoded information perfect a ticket purchasing process using the handheld in substantially real-time. Other aspects of the present disclosure are related to steps or actions taken by a revenue inspector to validate and/or sell tickets to particular vehicle passengers. Still other aspects of the present disclosure are related to steps or actions taken by an installation engineer to activate and install various passive tags or machine-readable elements at particular locations within the vehicle.

For example, in implementation, a computer-implemented method may include or comprise receiving, by a computing system from a mobile device, data that at least specifies a particular seat within a transit vehicle based upon a scan of a tag associated with the particular seat by the mobile device, when the mobile device is located within the transit vehicle. In some examples, the method may further include or comprise sending, by the computing system to the mobile device, data that at least specifies terms that when accepted permits an individual associated with the mobile device to travel on the transit vehicle within the particular seat. In some examples, the method may further include or comprise receiving, by the computing system from the mobile device, data that at least specifies acceptance to the terms to permit the individual associated with the mobile device to travel on the transit vehicle within the particular seat. Advantageously, such an implementation may enable a passenger or a revenue inspector to perfect an on-vehicle ticket purchase and/or validation process in accordance the principles of the present disclosure. Other benefits and/or advantages are possible as well.

For instance, in some examples, the method may further include or comprise sending by the computing system to the mobile device an electronic ticket as confirmation of acceptance to the terms to permit the individual associated with the mobile device to travel on the transit vehicle within the particular seat. Advantageously, such a feature may enable a passenger or a revenue inspector to provide upon request evidence as to proof of purchase of a ticket or fare to "ride" the transit vehicle. Other benefits and/or advantages are possible as well.

For instance, in some examples, the method may further include or comprise updating by the computing system a status associated with the particular seat to reflect acceptance to the terms to permit the individual associated with the mobile device to travel on the transit vehicle within the particular seat. Advantageously, such a feature may enable a passenger or a revenue inspector to, utilizing their handheld device, access the on-vehicle ticket purchase and/or validation system(s) of the present disclosure to quickly or swiftly come to an understanding of a "status" of any particular set within the transit vehicle. For example, by accessing the system using a handheld such as a smartphone or tablet a passenger or a revenue inspector may become informed in substantially real-time as to whether or not a particular passenger has purchased a ticket to travel on the transit vehicle in that particular seat. Other benefits and/or advantages are possible as well.

For instance, in some examples, the tag of the example method may include or comprise a near-field communication tag, or a two-dimensional barcode. Advantageously, such "tags" are relatively inexpensive and are easy to install and "program" so as to include or comprise relevant information, each of which may, separately of collectively, enable the various on-vehicle ticket purchase and/or validation aspects of the present disclosure. Other benefits and/or advantages are possible as well.

For instance, in some examples, the method may further include or comprise receiving by the computing system an indication to activate the tag associated with the particular seat. Advantageously, such a feature may enable an installation engineer to swiftly, using or utilizing a compatibly configured handheld device, activate or initialize a seat tag with the on-vehicle ticket purchase and/or validation system(s) of the present disclosure. Other benefits and/or advantages are possible as well.

For instance, in some examples, the method may further include or comprise receiving by the computing system authentication data for access to a particular account of the individual associated with the mobile device and charging a fee to the particular account based on the acceptance to the terms to permit the individual associated with the mobile device to travel on the transit vehicle within the particular seat. Advantageously, such a feature may enable a passenger or a revenue inspector to, using their handheld device, access a predefined and user-configurable passenger-specific customer account so as to permit an associated passenger or revenue inspector to quickly or swiftly perfect an on-vehicle ticket purchase and/or validation process in accordance the principles of the present disclosure. Other benefits and/or advantages are possible as well.

For instance, in some examples, the method may further include or comprise establishing a wireless communication link between the computing system and the mobile device to enable the individual to purchase a ticket to travel on the transit vehicle within the particular seat based upon the scan of the tag using the mobile device. Advantageously, such a feature may enable a passenger or a revenue inspector to freely traverse the transit vehicle and then quickly or swiftly perfect an on-vehicle ticket purchase and/or validation process, in connection with any particular seat within the transit vehicle, in accordance the principles of the present disclosure. Other benefits and/or advantages are possible as well.

For instance, in some examples, the method may further include or comprise sending by the computing system to the mobile device particular data for rendering of a map and an indicator to guide the individual to the particular seat. Additionally, in some examples, the method may further include or comprise sending by the computing system to the mobile device particular data for rendering of a map of the transit vehicle that identifies location of a plurality of seats including the particular seat. Additionally, in some examples, the method may further include or comprise sending by the computing system to the mobile device particular data for rendering of a map of the transit vehicle that identifies a status of each of a plurality of seats of the transit vehicle selected from occupied and unoccupied. Additionally, in some examples, the method may further include or comprise sending by the computing system to the mobile device particular data for rendering of a map of the transit vehicle that identifies a status of each of a plurality of seats of the transit vehicle selected from validated and unvalidated.

Advantageously, such features taken alone or together may enable a passenger or a revenue inspector to freely traverse and be guided through the transit vehicle and then quickly or swiftly perfect an on-vehicle ticket purchase and/or validation process, in connection with any particular seat within the transit, in accordance the principles of the present disclosure. Other benefits and/or advantages are possible as well.

For instance, in some examples, the method may further include or comprise receiving by the computing system from the mobile device a command to instantiate installation of a mobile application to the mobile device to enable the individual to purchase a ticket to travel on the transit vehicle within the particular seat based upon the scan of the tag using the mobile device. Advantageously, such a feature may enable a passenger or a revenue inspector to download and possibly personalize a mobile application to their handheld device to enable the passenger the revenue inspector to quickly or swiftly perfect an on-vehicle ticket purchase and/ or validation process, in connection with any particular seat within the transit, in accordance the principles of the present disclosure. Other benefits and/or advantages are possible as well.

For instance, in some examples, the method may further include or comprise receiving by the computing system from the mobile device data that specifies at least one of a particular travel itinerary and payment method to enable the individual to purchase a ticket to travel on the transit vehicle within the particular seat based upon the scan of the tag using the mobile device. Advantageously, such a feature may enable a passenger or a revenue inspector to quickly or swiftly perfect an on-vehicle ticket purchase and/or validation process, in connection with any particular seat within the transit, in accordance the principles of the present disclosure. Other benefits and/or advantages are possible as well.

For instance, in some examples, the method may further include or comprise sending by the computing system to the mobile device particular data for rendering of an image of the individual to verify identity of the individual. Advantageously, such a feature may enable a revenue inspector to quickly or swiftly perfect an on-vehicle ticket purchase and/or validation process, in connection with any particular seat within the transit, in accordance the principles of the present disclosure. Other benefits and/or advantages are possible as well.

Although not so limited, an appreciation of the various aspects of the present disclosure, along with the various benefits and/or advantages of such example implementations, may be gained from the foregoing discussion in connection with the drawings.

Figure 13:
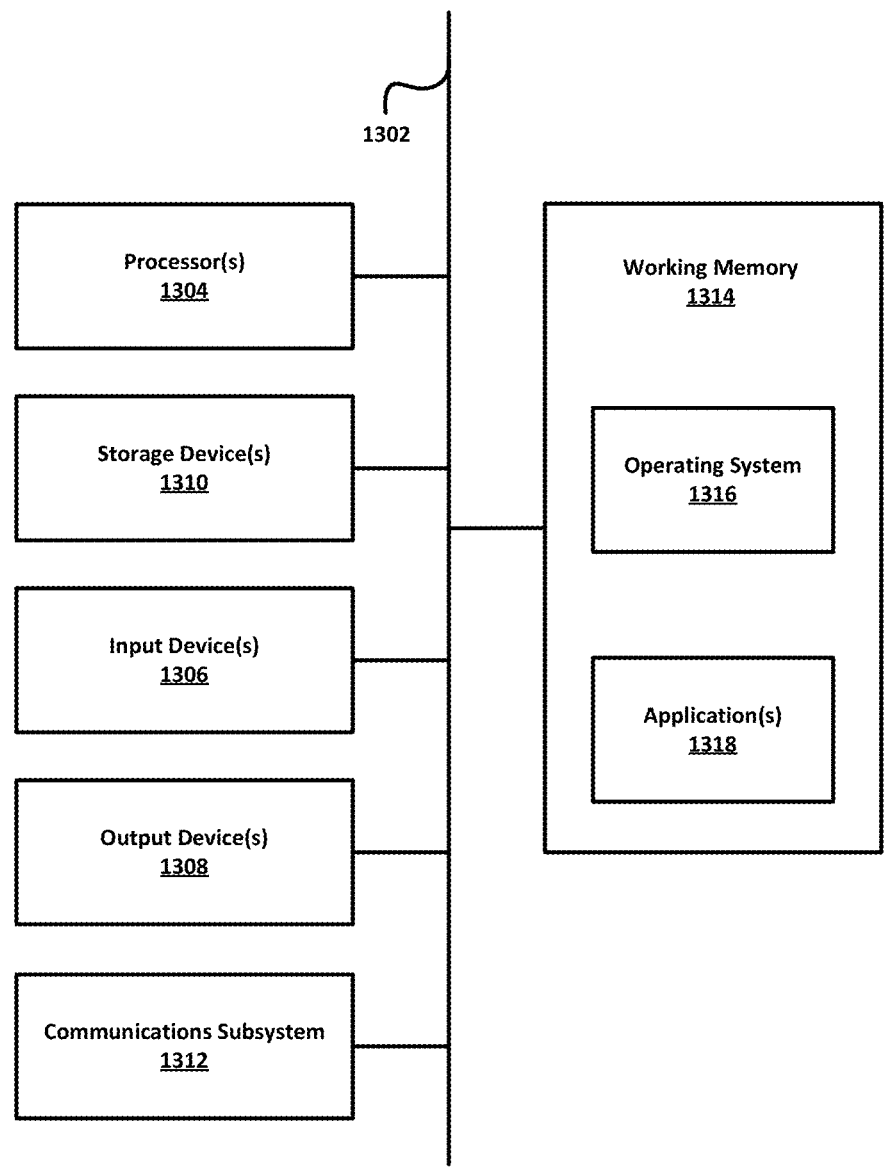
FIG. 13 shows an example computing system or device.

Referring now to FIG. 13, an example computer system or device 1300 in accordance with the disclosure. An example of a computer system or device includes an enterprise server, blade server, desktop computer, laptop computer, tablet computer, personal data assistant, smartphone, feature phone, and/or any other type of machine configured for performing calculations. Any particular one of the previously-described computing devices may be wholly or at least partially configured to exhibit features similar to the computer system 1300, such as any of the respective computing systems or devices of elements of at least FIG. 1 and FIGS. 5-7. In this manner, any of one or more of the respective elements of at least FIG. 1 and FIGS. 5-7 may be configured to perform and/or include instructions that, when executed, perform the method of FIGS. 2-4.

The computer device 1300 is shown comprising hardware elements that may be electrically coupled via a bus 1302 (or may otherwise be in communication, as appropriate). The hardware elements may include a processing unit with one or more processors 1304, including without limitation one or more general-purpose processors and/or one or more special-purpose processors (such as digital signal processing chips, graphics acceleration processors, and/or the like); one or more input devices 1306, which may include without limitation a touchscreen, remote control, a mouse, a keyboard, and/or the like; and one or more output devices 1308, which may include without limitation a presentation device (e.g., television), a printer, and/or the like.

The computer system 1300 may further include (and/or be in communication with) one or more non-transitory storage devices 1310, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1300 might also include a communications subsystem 1312, which may include without limitation a modem, a network card (wireless and/or wired), an infrared communication device, a wireless communication device and/or a chipset such as a Bluetooth™ device, 1302.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 1312 may permit data to be exchanged with a network (such as the network described below, to name one example), other computer systems, and/or any other devices described herein. In many examples, the computer system 1300 will further comprise a working memory 1314, which may include a random access memory and/or a read-only memory device, as described above.

The computer device 1300 also may comprise software elements, shown as being currently located within the working memory 1314, including an operating system 1316, device drivers, executable libraries, and/or other code, such as one or more application programs 1318, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1310 described above. In some cases, the storage medium might be incorporated within a computer system, such as computer system 1300. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1300 and/or might take the form of source and/or installable code, which, upon compilation and/or installation on the computer system 1300 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 1300) to perform methods in accordance with various examples of the disclosure. According to a set of examples, some or all of the procedures of such methods are performed by the computer system 1300 in response to processor 1304 executing one or more sequences of one or more instructions (which might be incorporated into the operating system 1316 and/or other code, such as an application program 1318) contained in the working memory 1314. Such instructions may be read into the working memory 1314 from another computer-readable medium, such as one or more of the storage device(s) 1310. Merely by way of example, execution of the sequences of instructions contained in the working memory 1314 may cause the processor(s) 1304 to perform one or more procedures of the methods described herein.

The term "machine-readable medium" and/or "computer-readable medium," as used throughout, may refer to any non-transitory medium that participates in providing data that causes a machine to operate in a specific fashion. In an example implemented using the computer device 1300, various computer-readable media might be involved in providing instructions/code to processor(s) 1304 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1310. Volatile media may include, without limitation, dynamic memory, such as the working memory 1314.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 1304 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1300.

The communications subsystem 1312 (and/or components thereof) generally will receive signals, and the bus 1302 then might carry the signals (and/or the data, instructions, etc. carried by the signals) to the working memory 1314, from which the processor(s) 1304 retrieves and executes the instructions. The instructions received by the working memory 1314 may optionally be stored on a non-transitory storage device 1310 either before or after execution by the processor(s) 1304.

It should further be understood that the components of computer device 1300 can be distributed across a network. For example, some processing may be performed in one location using a first processor while other processing may be performed by another processor remote from the first processor. Other components of computer system 1300 may be similarly distributed. As such, computer device 1300 may be interpreted as a distributed computing system that performs processing in multiple locations. In some instances, computer system 1300 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/ or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, certain circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   establishing a wireless communication link between a computing system and a mobile device to enable an individual to purchase a ticket to travel on a transit vehicle within a particular seat;
   sending by the computing system to the mobile device particular data for rendering of a map of the transit vehicle that identifies a status of each of a plurality of seats of the transit vehicle selected from occupied and unoccupied or validated and unvalidated;
   receiving, by the computing system from the mobile device, data that at least specifies the particular seat within the transit vehicle based upon a scan of a tag associated with the particular seat by the mobile device, when the mobile device is located within the transit vehicle;
   sending, by the computing system to the mobile device, data that at least specifies terms that when accepted permits an individual associated with the mobile device to travel on the transit vehicle within the particular seat;

receiving, by the computing system from the mobile device, data that at least specifies acceptance to the terms to permit the individual associated with the mobile device to travel on the transit vehicle within the particular seat; and updating, by the computing system, a status associated with the particular seat to reflect acceptance to the terms to permit the individual associated with the mobile device to travel on the transit vehicle within the particular seat.

2. The method of claim 1, further comprising:
sending by the computing system to the mobile device an electronic ticket as confirmation of acceptance to the terms to permit the individual associated with the mobile device to travel on the transit vehicle within the particular seat.

3. The method of claim 1, wherein:
the tag comprises a near-field communication tag.

4. The method of claim 1, wherein:
the tag comprises a two-dimensional barcode.

5. The method of claim 1, further comprising:
receiving by the computing system an indication to activate the tag associated with the particular seat.

6. The method of claim 1, further comprising:
receiving by the computing system authentication data for access to a particular account of the individual associated with the mobile device; and
charging a fee to the particular account based on the acceptance to the terms to permit the individual associated with the mobile device to travel on the transit vehicle within the particular seat.

7. The method of claim 1, further comprising:
sending by the computing system to the mobile device particular data for rendering of the map and an indicator to guide the individual to the particular seat.

8. The method of claim 1, further comprising:
receiving by the computing system from the mobile device a command to instantiate installation of a mobile application to the mobile device to enable the individual to purchase a ticket to travel on the transit vehicle within the particular seat based upon the scan of the tag using the mobile device.

9. The method of claim 1, further comprising:
receiving by the computing system from the mobile device data that specifies at least one of a particular travel itinerary and payment method to enable the individual to purchase a ticket to travel on the transit vehicle within the particular seat based upon the scan of the tag using the mobile device.

10. The method of claim 1, further comprising:
sending by the computing system to the mobile device particular data for rendering of an image of the individual to verify identity of the individual.

11. A computer-implemented method, comprising:
receiving, by a mobile device from a computing system, particular data for rendering of a map of a transit vehicle that identifies a status of each of a plurality of seats of the transit vehicle selected from occupied and unoccupied;
receiving, by the mobile device based upon a scan of a tag associated with a particular seat within the transit vehicle, and when the mobile device is located within the transit vehicle, particular data that at least identifies the particular seat;
sending, by the mobile device to the computing system that is different than the mobile device, at least the particular data that at least identifies the particular seat; and
receiving, by the mobile device from the computing system, data that at least specifies terms that when accepted authorizes an individual associated with the mobile device to travel on the transit vehicle within the particular seat.

12. The method of claim 11, wherein:
the tag comprises a near-field communication tag.

13. The method of claim 11, wherein:
the tag comprises a two-dimensional barcode.

14. The method of claim 11,
establishing a wireless communication link between the computing system and the mobile device to enable the individual to purchase a ticket to travel on the transit vehicle within the particular seat based upon the scan of the tag using the mobile device.

15. A computer-implemented method, comprising:
sending, by a computing system to a mobile device, particular data for rendering of a map of a transit vehicle that identifies a status of each of a plurality of seats of the transit vehicle selected from validated and unvalidated;
receiving, by the computing system from the mobile device, data that at least specifies a particular seat within the transit vehicle based upon a scan of a tag that is associated with the particular seat by the mobile device and that is selected from a near-field communication tag and a two-dimensional barcode, when the mobile device is located within the transit vehicle;
sending, by the computing system to the mobile device, data that at least specifies terms that when accepted permits an individual to travel on the transit vehicle within the particular seat;
receiving, by the computing system from the mobile device, data that at least specifies acceptance to the terms to permit the individual associated with the mobile device to travel on the transit vehicle within the particular seat; and
updating by the computing system a status associated with the particular seat to reflect acceptance to the terms to permit the individual to travel on the transit vehicle within the particular seat.

* * * * *